(12) United States Patent
Nakadai et al.

(10) Patent No.: US 6,967,455 B2
(45) Date of Patent: Nov. 22, 2005

(54) ROBOT AUDIOVISUAL SYSTEM

(75) Inventors: Kazuhiro Nakadai, Chiba (JP); Ken-ichi Hidai, Saitama (JP); Hiroshi Okuno, Tokyo (JP); Hiroaki Kitano, Saitama (JP)

(73) Assignee: Japan Science and Technology Agency, Kawaguchi (JP)

( * ) Notice: Subject to any disclaimer, the term of this patent is extended or adjusted under 35 U.S.C. 154(b) by 172 days.

(21) Appl. No.: 10/468,396

(22) PCT Filed: Mar. 8, 2002

(86) PCT No.: PCT/JP02/02204

§ 371 (c)(1),
(2), (4) Date: Aug. 29, 2003

(87) PCT Pub. No.: WO02/072317

PCT Pub. Date: Sep. 19, 2002

(65) Prior Publication Data

US 2004/0104702 A1 Jun. 3, 2004

(30) Foreign Application Priority Data

| Mar. 9, 2001 | (JP) | ......................................... 2001-67846 |
| Mar. 9, 2001 | (JP) | ......................................... 2001-67847 |
| Mar. 9, 2001 | (JP) | ......................................... 2001-67848 |
| Mar. 9, 2001 | (JP) | ......................................... 2001-67849 |

(51) Int. Cl.$^7$ ............................................... B25J 13/08
(52) U.S. Cl. ............... 318/568.12; 318/567; 318/568.1; 318/568.13; 700/19; 700/20; 700/23; 700/245; 700/249; 901/47
(58) Field of Search ......................... 318/568.12, 568.1, 318/568.13, 568.16, 565; 901/47, 46; 700/19, 20, 23, 245, 249

(56) References Cited

U.S. PATENT DOCUMENTS 5,289,273 A * 2/1994 Lang ........................... 348/121
5,465,525 A * 11/1995 Mifune et al. ............. 43/132.1
6,544,098 B1 * 4/2003 Hampton et al. ........... 446/301
6,708,068 B1 * 3/2004 Sakaue ......................... 700/47

FOREIGN PATENT DOCUMENTS

| JP | 2000-148184 | 5/2000 |
| JP | 2001-175869 | 6/2001 |
| JP | 2000-22677 | 8/2001 |
| JP | 2001-212780 | 8/2001 |
| WO | WO 00/015396 | 3/2000 |

* cited by examiner

Primary Examiner—Rita Leykin

(57) ABSTRACT

A robot visuoauditory system that makes it possible to process data in real time to track vision and audition for an object, that can integrate visual and auditory information on an object to permit the object to be kept tracked without fail and that makes it possible to process the information in real time to keep tracking the object both visually and auditorily and visualize the real-time processing is disclosed. In the system, the audition module (20) in response to sound signals from microphones extracts pitches therefrom, separate their sound sources from each other and locate sound sources such as to identify a sound source as at least one speaker, thereby extracting an auditory event (28) for each object speaker. The vision module (30) on the basis of an image taken by a camera identifies by face, and locate, each such speaker, thereby extracting a visual event (39) therefor. The motor control module (40) for turning the robot horizontally. extracts a motor event (49) from a rotary position of the motor. The association module (60) for controlling these modules forms from the auditory, visual and motor control events an auditory stream (65) and a visual stream (66) and then associates these streams with each other to form an association stream (67). The attention control module (6) effects attention control designed to make a plan of the course in which to control the drive motor, e.g., upon locating the sound source for the auditory event and locating the face for the visual event, thereby determining the direction in which each speaker lies. The system also includes a display (27, 37, 48, 68) for displaying at least a portion of auditory, visual and motor information. The attention control module (64) servo-controls the robot on the basis of the association stream or streams.

26 Claims, 17 Drawing Sheets

Block 2

Block 3

Block 4

F I G. 9
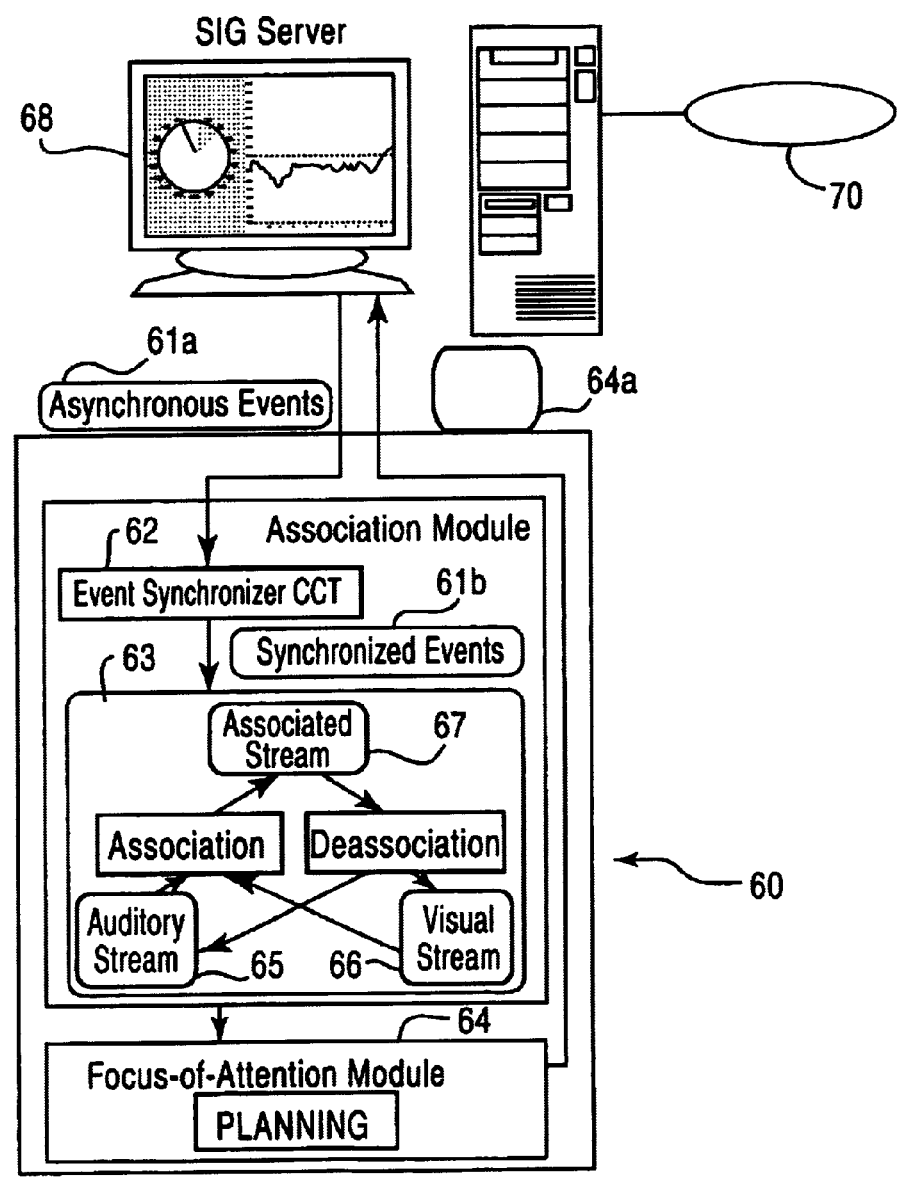
Block 5

FIG. 10
(A)
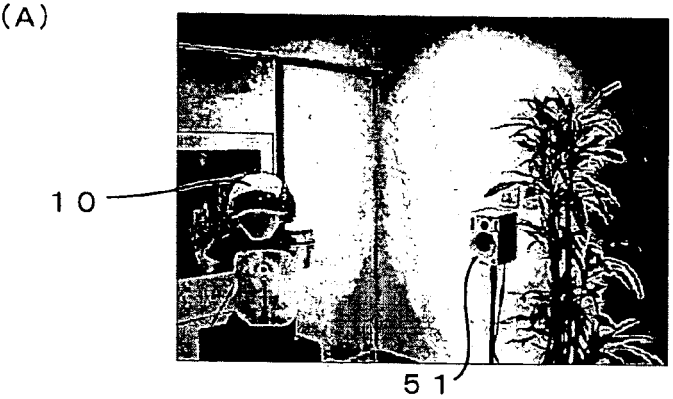
(B)
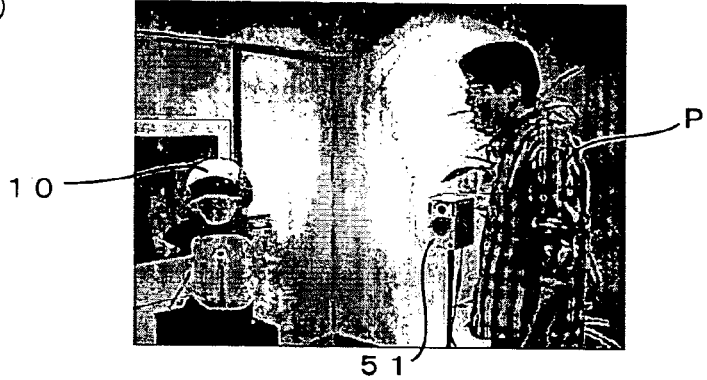
(C)
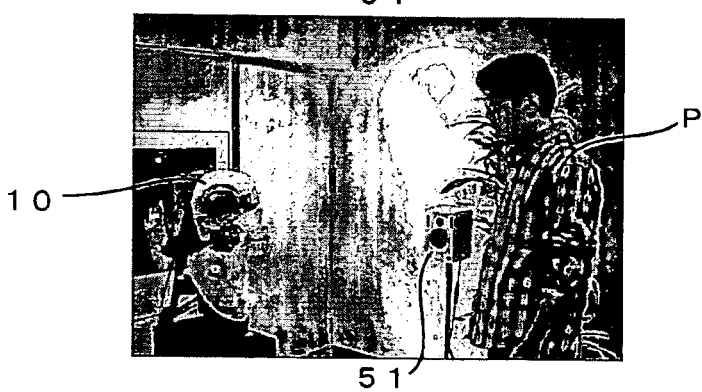
(D)
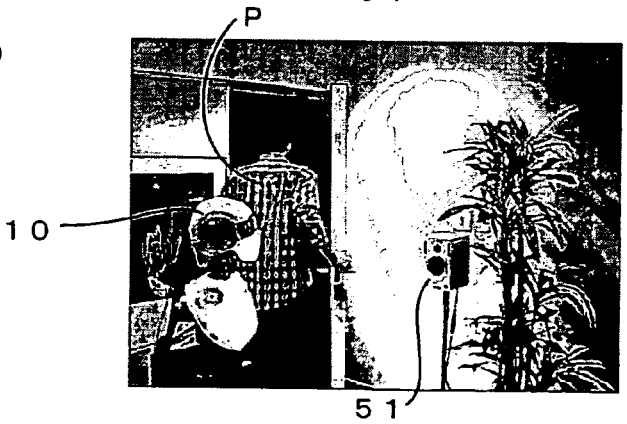

F I G. 11
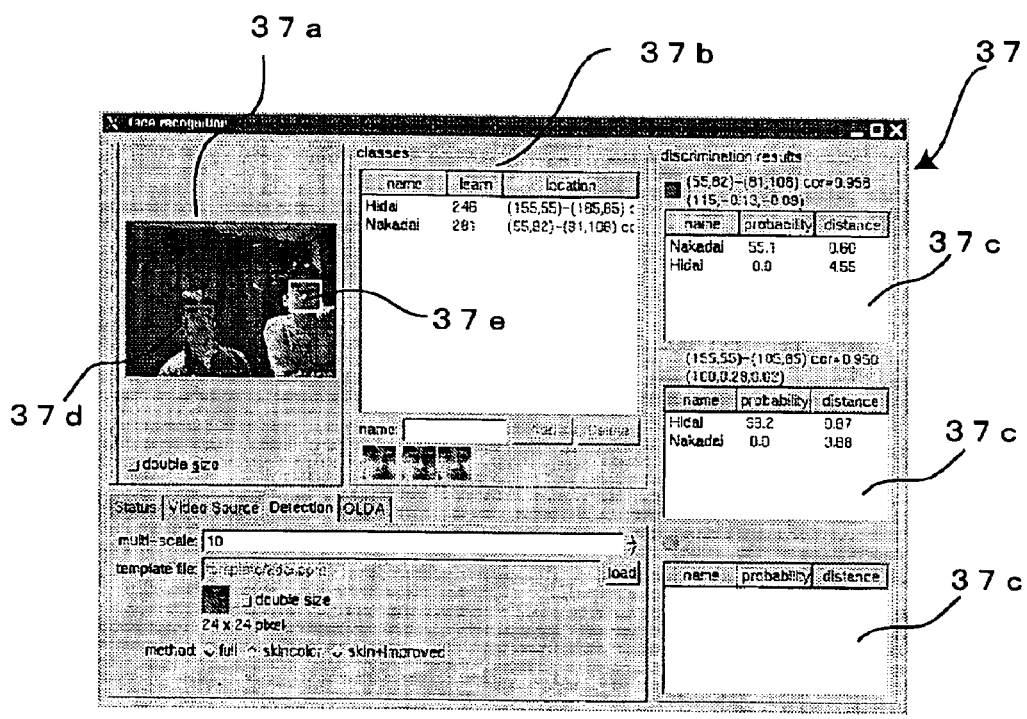

F I G. 1 5
(A)
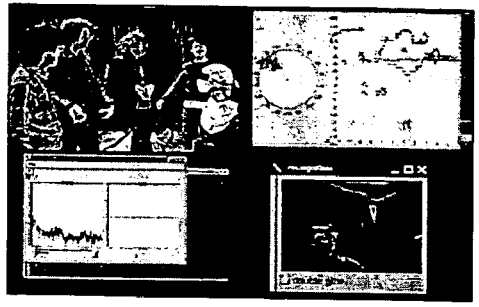
(B)
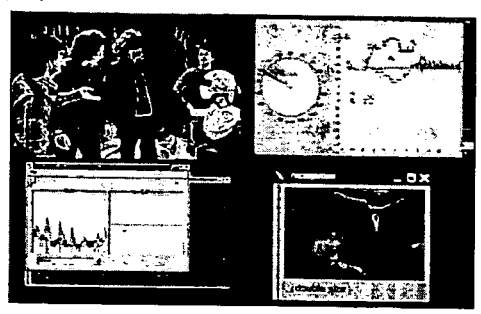
(C)
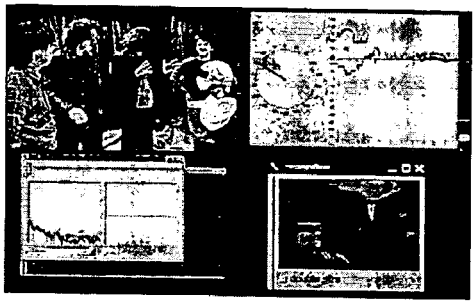
(D)
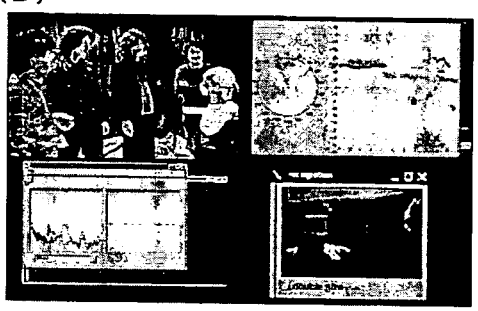
(E)
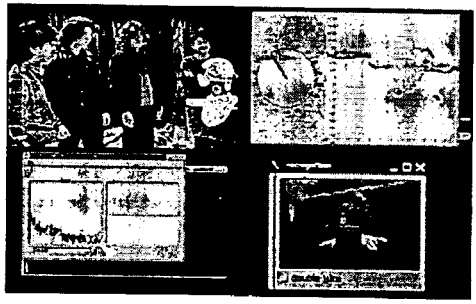
(F)
(G)
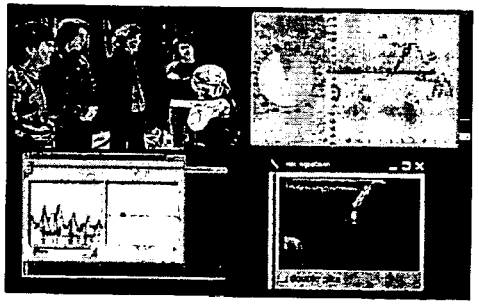
(H)
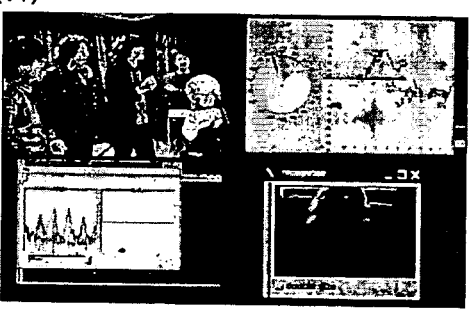

F I G. 1 6
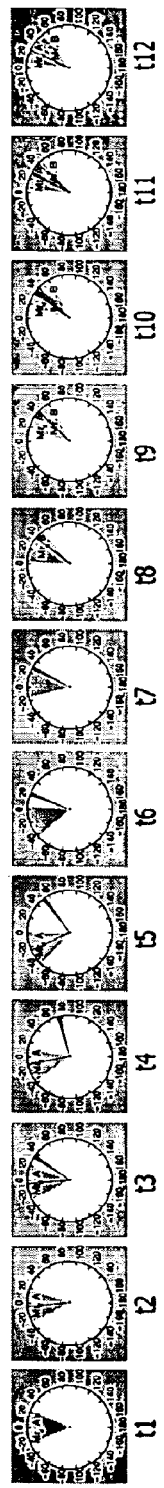
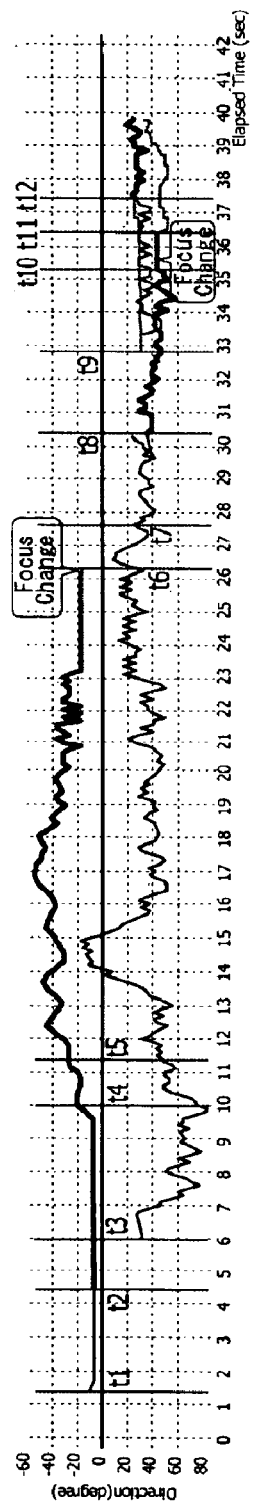
(A)　(B)　(C)

US 6,967,455 B2

ROBOT AUDIOVISUAL SYSTEM

TECHNICAL FIELD

The present invention relates to a visuoauditory system that is suitable for use with a robot, e.g., a robot of human type ("humanoid") or animal type ("animaloid"). The term "robot" used herein, however, is not intended to refer only to a humanoid or animaloid robot, but used to encompass those for industrial applications as well and generally to refer an active electronic machine that can be controlled automatically.

BACKGROUND ART

For active electronic machines such as robots of human and animal types, attention has in recent years been drawn to active senses of vision and audition. A sense by a sensory device provided in a robot for its vision or audition is made active (active sensory perception) when a portion of the robot such as its head carrying the sensory device is varied in position or orientation as controlled by a drive means in the robot so that the sensory device follows the movement or instantaneous position of a target or object to be sensed or perceived.

As for active vision, studies have diversely been undertaken using an arrangement in which at least a camera as the sensory device holds its optical axis directed towards an object by being controlled in position by the drive means while permitting itself to perform automatic focusing and zooming in and out relative to the object to take a picture thereof.

As for active audition or hearing, at least a microphone as the sensory device may likewise have its facing kept directed towards a target or object by being controlled in position by the drive mechanism to collect a sound from the object. Such active audition may refer to visual information to determine the direction in which the sound source lies, as disclosed by the present applicant in Japanese patent application No. 2000-22677 entitled "Robot Auditory System".

By the way, the active vision and audition are closely related to a motor control module for changing the direction of a robot (in a horizontal plane). In order to make its active vision and audition work with respect to a specific object, it is necessary to direct the robot towards the specific object, i.e., to make an attention control.

Combining vision and audition with a motor control module in turn requires processing data in real time to make track for vision and audition. In the conventional robot development efforts, however, while there has been developed a real-time processing system for a single sound source object, no attempt has been made to develop an active auditory system in which data are processed in real time in a situation, e.g., that people are talking to each other, to identify each individual person.

For a robot to precisely identify each individual speaker as a specific object on the basis of its environmental conditions requires visual and auditory data to be integrated. No active auditory system has been developed in which such data are processed in real time in a situation, e.g., that people are talking to each other, to identify each individual person.

For vision and audition to be united with controlling a motor control module, not only is it necessary to process data in real time to make track for vision and audition, but also it is extremely useful to process in real time data for the internal state and to visualize it in such a visual and auditory tracking process. In the conventional robot development efforts, however, while there has been developed such a real-time processing system for a single sound source object, no attempt has been made to develop an active auditory system in which such data are processed in real time in a situation, e.g., that people are talking to each other, to identify each individual person, nor has there been any attempt to make such visualization in real time.

Also, while the attention control for a drive motor in a motor module has so far been undertaken using either vision servo or auditory servo as it is called, no system has been proposed whereby a robot is accurately controlled using visuoauditory servo, i.e., using both its vision and audition concurrently.

DISCLOSURE OF THE INVENTION

With the foregoing taken into account, it is a first object of the present invention to provide a robot visuoauditory system that makes it possible to process data in real time to track vision and audition for an object or target, and to integrate information from sensors for vision, audition and a motor in such a manner that if any portion of the information is missing or broken off, the remaining information may complement it to allow the object to be continuingly tracked.

A second object of the present invention is to provide a robot visuoauditory system that can integrate visual and auditory information on an object to permit the object to be kept tracked without fail.

A third object of the present invention is to provide a robot visuoauditory system that makes it possible to process the information in real time to keep tracking the object both visually and auditorily and at the same time to visualize the real-time processing.

A fourth object of the present invention is to provide a visuoauditory system for a robot whereby the robot is visuoauditory servo-controlled using both its vision and audition with an object kept tracked both visually and auditorily.

The first object mentioned above is attained in accordance with the present invention in a first aspect thereof by a visuoauditory system for a robot characterized in that it comprises: an audition module including at least a pair of microphones for collecting external sounds; a vision module including a camera for taking an image in front of the robot; a motor control module including a drive motor for turning the robot horizontally, an association module for combining events from said audition module, said visual module and said motor control module to produce streams; and an attention control module for effecting attention control on the basis of the streams produced by said association module, whereby: the said audition module in response to sound signals from the said microphones is adapted to extract pitches therefrom, separate their sound sources from each other and locate sound sources such as to identify a sound source as at least one speaker, thereby extracting an auditory event; the said vision module on the basis of an image taken by the camera is adapted to identify by face, and locate, each such speaker, thereby extracting a visual event therefor; the said motor control module in response to a rotary position of the said drive motor is adapted to extract a motor event therefrom; the said association module on the basis of the auditory event from the said audition module, the visual event from the said vision module and the motor event from the said motor control module is adapted to form an auditory stream and a visual stream and then associate these streams with each other to form an association stream; and the said attention control module in effecting the attention control is adapted to make a plan for a course in which to control the said drive motor in the said motor control module in accordance with the said streams.

In this robot visuoauditory system according to the present invention, the said association module when forming the said auditory and visual streams is preferably adapted to synchronize said auditory, visual and motor events which are formed asynchronously with each other.

In this robot visuoauditory system according to the present invention, preferably the said association module is made a server and each of the said audition, vision and motor control modules are made a client connected to the said server in.

In this robot visuoauditory system according to the present invention, the said server and each said client are interconnected via LAN.

In this robot visuoauditory system according to the present invention, when the said attention control module effects the attention control, higher priority is preferably given in the order of the association stream, the auditory stream and the visual stream.

The system so configured as mentioned above allows the audition module to extract pitches from sounds collected by the microphones from external objects by using a harmonic structure thereof to find and identify the direction in which each of the sound sources as individual speakers lies, thereby extracting an auditory event for each object speaker.

Also, the vision module on the basis of an image taken by a camera is allowed to identify by face, and locate, each such speaker, thereby extracting a visual event therefor.

Further, the motor control module is allowed to extract a motor event by detecting the direction in which the robot faces on the basis of a rotary position of the drive motor for turning the robot horizontally.

At this point it should be noted that the term "event" as used herein is intended to refer to the occurrence that at a given point of time, a sound or face is detected or a feature such a pitch and its direction is extracted to identify, recognize or discriminate the speaker or face, or the state that the drive motor is in rotation. The term "stream" as used herein is intended to refer to events interconnected so as to continue with time while effecting error correction.

Here, the association module on the basis of an auditory, a visual and a motor event thus extracted, respectively, forms an auditory and a visual stream for each speaker and, upon associating these streams with each other, form an association stream. Then, the attention control module on the basis of these streams effects attention control, thereby making a plan of the course in which to control the drive motor in the motor control module.

The term "attention" as used herein is intended to causing the robot to pay attention auditorily and/or visually to an object speaker. Likewise, the term "attention control" as used herein is intended to refer to the motor control module causing the robot to change its position and/or direction or orientation and thereby to pay attention to the object speaker.

Thus, the attention control module directs the robot to face towards an object speaker by controlling the drive motor in the motor control module on the basis of the plan made. Thus, directing the robot to face opposite to the object speaker allows the audition module to collect through the microphones a voice of the object speaker in the front direction in which the voice can be collected at a high Signal-to-noise (S/N) ratio and thereby to locate the object speaker accurately, while at the same time permitting the vision module to take through the camera a clear-cut image of that object speaker.

Also, even when either its auditory or visual event is missing or broken off, an object speaker can be perceived by the attention control module on the basis of only its visual or auditory event that remains extant, thereby permitting the motor control module to be controlled in real time.

Accordingly, making the audition module, the vision module and the motor control module to cooperate with the association module and the attention control module allows the ambiguities which the audition and vision of the robot individually possess to complement each other, thereby rising the so-called robustness of the system. Moreover, more than one speakers can be thereby individually perceived.

In case the association module when forming an auditory and a visual stream synchronizes an auditory, a visual and a motor event with each other if they are formed asynchronously with each other, the fact that the auditory, visual and motor events which are formed asynchronously with each other are synchronized with each other allows different portions of the periods in which these events are formed in the association module and different portions of the delay times then entailed to be absorbed and, and allows an auditory stream made of the auditory event and a visual stream made of the visual event if they exist close to each other in distance to be associated with each other to form a higher order association stream.

In case the association module is made a server and each of the audition, vision and motor control modules are made a client connected to the server and the server and each such client are interconnected via LAN, the fact that the clients connected to the server via LAN are subjected to distributed processing allows their events to be processed rapidly in real time.

Giving higher priority in the order of an association, an auditory and a visual stream when the attention control module effects attention control, namely having primary reference to the association stream and subsidiary reference to the auditory and visual streams allows a particular speaker to be kept tracked, e.g., if it fails to acquire a visual event of the speaker and thus it fails to form a visual stream thereof, then by continuingly acquiring an auditory event to form an auditory stream thereof and effecting attention control on the basis of the auditory stream formed. Further, if more than one streams of the same type exist, priority may be given to the oldest or the newest, depending on particular circumstances encountered.

In this way, dealing with events and streams, each symbolic, used to represent auditory and visual information allows displaying in real time in the display since the amount of data can be largely compressed compared with dealing with unsymbolized sound and image data.

The second object mentioned above is achieved in accordance with the present invention in a second aspect thereof by a visuoauditory system for a robot, characterized in that it comprises: an audition module including at least a pair of microphones for collecting external sounds; a vision module including a camera for taking an image in front of the robot; a motor control module including a drive motor for turning the robot horizontally, an association module for combining events from the said audition module, the said visual module and the said motor control module to produce streams; and an attention control module for effecting attention control on the basis of the streams produced by the said association module, whereby: the said audition module in response to sound signals from the said microphones is adapted to extract pitches therefrom, separate their sound sources from each other and locate sound sources such as to identify a sound source as at least one speaker, thereby extracting an auditory event; the said vision module on the basis of an image taken by the camera is adapted to identify by face, and locate, each such speaker, and then to identify it as the sound source, thereby extracting a visual event therefor; the said motor control module in response to a rotary position of the said drive motor is adapted to extract a motor event therefrom; the said association module on the basis of the said auditory event, the said visual event and the said motor event is adapted to form an auditory stream and a visual stream upon determining a direction in which each such speaker lies on the basis of directional information derived from locating the sound source of the said auditory event and that from locating the face of the said visual event, and then to associate these streams with each other to form an association stream; and the said attention control module in effecting the attention control is adapted to make a plan for a course in which to control the said drive motor in the said motor control module in accordance with the said streams.

In this robot visuoauditory system according to the present invention, the said association module when forming the said auditory and visual streams is preferably adapted to synchronize the said auditory, visual and motor events which are formed asynchronously with each other.

In this robot visuoauditory system according to the present invention, the said audition module is preferably adapted to identify each such speaker upon detecting a voice MFCC from the sound signals, and the said association module is preferably adapted to select the said auditory stream and the said visual stream to which the said auditory event and the said visual event are to be connected, by specifying each such speaker on the basis of speaker identification for the said auditory event and speaker identification for the said visual event.

In this robot visuoauditory system according to the present invention, with a plurality of streams coming close to one another, the said association module is preferably adapted to select the said auditory stream and the said visual stream to which the said auditory event and the said visual event are to be connected, by referring to temporal flows of the said auditory and visual events.

In this robot visuoauditory system according to the present invention, the said association module is preferably adapted to associate the said auditory stream and the said visual stream with each other to form the said association stream if they are strongly associated with each other and to disassociate and extinguish the said association stream when the said auditory and visual streams which make up the same become weakly associated with each other.

According to the system makeup mentioned above, the audition module receives sounds collected by microphones from external objects as sound sources and extracts pitches from the collected sounds utilizing their harmonic structures to find the directions in which the sound sources exist, respectively, and to identify the individual speakers as the respective object sound sources and then extracts their own auditory events.

Also, the vision module receives images of the speakers taken by a camera and extracts from the images the respective visual events of the individual speakers upon identifying the faces of the speakers by pattern recognition and locating the speakers.

Further, the motor control module extracts a motor event upon detecting a direction in which the robot faces on the basis of a rotary position of the drive motor turning the robot horizontally.

At this point it should be noted that the term "event" as used herein is intended to refer to a collection of a series of data with time information formed reflecting the occurrence that at a given point of time, a sound or face is detected or a feature such a pitch and its direction is extracted to identify, recognize or discriminate the speaker or face, or a collection of positional data with time information for the drive motor at a given time instant or instants. The term "stream" as used herein is intended to refer to events interconnected so as to continue with time while effecting error correction.

Here, the association module on the basis of the auditory event, the visual event and the motor event thus extracted forms an auditory stream and a visual stream for each such speaker upon determining a direction in which each such speaker lies on the basis of directional information derived from locating the sound source of the auditory event and that from locating the face of the visual event, and then to associate these streams with each other to form an association stream.

In this case, the association module determines the direction in which each such speaker lies on the basis of directional information derived from locating the sound source of the said auditory event and that from locating the face of the said visual event, and then to form an association stream with reference to the determined direction of each such speaker.

And, the attention control module effect the attention control on the basis of these streams whereby a plan for the course in which to control the said drive motor in the said motor control module is made.

The term "attention" as used herein is intended to causing the robot to pay attention auditorily and/or visually to an object speaker. Likewise, the term "attention control" as used herein is intended to refer to the motor control module causing the robot to change its position and/or direction or orientation and thereby to pay attention to the object speaker.

And then, the attention control module by controlling the drive motor in the motor control module on the basis of a result of the plan directs the robot to face opposite to the object speaker. Thus, directing the robot to face opposite to the object speaker allows the audition module to collect through the microphones a voice of the object speaker in the front direction in which the voice can be collected at the highest sensitivity and thereby to locate the object speaker accurately, while permitting at the same time the vision module to take through the camera a clear-cut image of that object speaker.

Also, even when either its auditory or visual event is missing or broken off, an object speaker can be perceived through attention control on the basis of its visual or auditory event that remains extant, and thereby to permit the motor control module to be controlled upon seizing the direction of the object speaker accurately.

Accordingly, the audition module, the vision module and the motor control module are made to cooperate with the association module and the attention control module to allow determining the direction of each such speaker on the basis of the directional information of locating the sound source from the auditory event and locating the speaker from the visual event and thus to allow the ambiguities which the audition and vision of the robot individually possess to complement each other, thereby rising the so-called robustness of the system. Moreover, more than one speakers can be thereby individually perceived without fail.

In case the association module when forming an auditory and a visual stream synchronizes an auditory, a visual and a motor event with each other if they are formed asynchronously with each other, the fact that the auditory, visual and motor events which are formed asynchronously with each other are synchronized with each other allows different portions of the periods in which these events are formed in the association module and different portions of the delay times then entailed to be absorbed and allows an auditory stream made of the auditory event and a visual stream made of the visual event if they exist close to each other in distance to be associated with each other to form a higher order association stream.

If the audition module identifies each such speaker upon detecting a voice MFCC (Mel Frequency Cepstrum Coefficient) from the sound signals, and the association module selects the auditory stream and the visual stream to which the auditory event and the visual event are to be connected, by specifying each such speaker on the basis of speaker identification for the auditory event and speaker identification for the visual event, each such speaker can be identified by the MFCC of a voice from its auditory event, the individual speakers can be identified by their own auditory and visual events, respectively. Thus, in forming auditory and visual streams of a plurality of speakers, an auditory and a visual event of a speaker can be connected to an auditory and a visual stream of the same speaker to specify each speaker accurately. Also, even if one of an auditory and a visual event of a speaker is broken off midway, an attempt to identify the speaker can be continued with the other event. Thus, if voices from a plurality of speakers are detected from a same direction, this higher-order integration of audition and vision allows the speakers to be separated from one another accurately and individually tracked upon identifying the speakers.

If with a plurality of streams coming close to one another, the association module selects the auditory stream and the visual stream to which the auditory event and the visual event are to be connected, by referring to temporal flows of the auditory and visual events, it is possible, even in case a plurality of speakers come close to one another to cause the auditory and visual streams of these speakers to cross one another, to keep the auditory and visual streams of any particular speaker accurately upon predicting its movement. Thus, the ambiguities which these auditory and visual streams possess individually are allowed to complement each other, thus raising the so-called robustness of the system while permitting a plurality of speakers to be tracked individually without fail.

In case the association module is adapted to associate an auditory stream and a visual stream with each other to form an association stream if they are strongly associated with each other and to disassociate and extinguish the association stream when the auditory and visual streams which make up the same become weakly associated with each other, it is possible to form an association stream accurately for each speaker, thus circumventing the ambiguities which the auditory and visual streams possess individually, thereby permitting each speaker to be discriminated from another accurately.

Also, selecting the angle suitably allows a speaker while moving to be captured without fail, in a manner of predicting a movement of the speaker for its specifying.

In this way, dealing with events and streams, each symbolic, used to represent auditory and visual information allows displaying in real time in the display since the amount of data can be largely compressed compared with dealing with unsymbolized sound and image data.

The third object mentioned above is achieved in accordance with the present invention in a third aspect thereof by a visuoauditory system for a robot, characterized in that it comprises: an audition module including at least a pair of microphones for collecting external sounds; a vision module including a camera for taking an image in front of the robot; a motor control module including a drive motor for turning the robot horizontally, an association module for combining events from the said audition module, the said visual module and the said motor control module to produce streams; and an attention control module for effecting attention control on the basis of the streams produced by said association module, whereby: the said audition module in response to sound signals from the said microphones is adapted to extract pitches therefrom, separate their sound sources from each other and locate sound sources such as to identify a sound source as at least one speaker, thereby extracting an auditory event; the said vision module on the basis of an image taken by the camera is adapted to identify by face, and locate, each such speaker, thereby extracting a visual event therefor; the said motor control module in response to changes in a rotary position of the said drive motor is adapted to extract a motor event therefrom; the said association module on the basis of the auditory event from the said audition module, the visual event from the said vision module and the motor event from the said motor control module is adapted to form an auditory stream and a visual stream and then associate these streams with each other to form an association stream; and the said attention control module in effecting the attention control is adapted to make a plan for a course in which to control the said drive motor in the said motor control module in accordance with the said streams, wherein the said system further comprises a display for displaying at least a portion of auditory information for the said audition module, visual information for the said vision module, motor information for the said motor control module and stream information for the said association module.

In this robot visuoauditory system according to the present invention, the said display preferably includes an auditory display for displaying as the auditory information, a spectrum of sound signals from sound sources and peaks extracted therefrom and the said auditory event.

In this robot visuoauditory system according to the present invention, the said auditory display is preferably adapted to display the said auditory event in the form of a circle with its center representing the robot, its axis of ordinates representing relative angles of the direction that the robot may face, its axis of abscissas representing pitches and its diameter representing a belief factor.

In this robot visuoauditory system according to the present invention, the said display preferably includes a visual display for displaying as the said visual information, an image of an extracted face taken by the camera and shown within a frame, and the said visual event.

In this robot visuoauditory system according to the present invention, the said visual display is preferably adapted to display the said visual event in the form of list of face identifications and face locations extracted with degrees of firmness.

In this robot visuoauditory system according to the present invention, the said display preferably includes a motor display for displaying as said motor information, the direction in which and the speed at which the robot moves, three-dimensionally in real time.

In this robot visuoauditory system according to the present invention, the said display preferably includes a stream display for displaying as the stream information, a stream chart and a radar chart.

In this robot visuoauditory system according to the present invention, the said stream display is preferably adapted to display in the said stream chart, the said auditory, visual and association streams constituting the said stream information.

In this robot visuoauditory system according to the present invention, the said stream display is preferably adapted to display in the said radar chart, an instantaneous status of the said streams with a visual field of the camera and upon sound source location.

The system so configured as mentioned above allows the audition module to extract pitches from sounds collected by the microphones from external objects as sound sources by using a harmonic structure thereof to find and identify the direction in which each of the sound sources as individual speakers lies, thereby extracting an auditory event for each object speaker.

Also, the vision module on the basis of an image taken by a camera is allowed to identify by face, and locate, each such speaker, thereby extracting a visual event therefor.

Further, the motor control module is allowed to extract a motor event by detecting the direction in which the robot faces on the basis of all the rotary position of the drive motor for turning the robot horizontally.

At this point it should be noted that the term "event" as used herein is intended to refer to the occurrence that at a given point of time, a sound or face is detected or a feature such a pitch and its direction is extracted to identify, recognize or discriminate the speaker or face, or the state that the drive motor is in rotation. The term "stream" as used herein is intended to refer to events interconnected so as to continue with time while effecting error correction.

Here, the association module on the basis of an auditory, a visual and a motor event thus extracted, respectively, forms an auditory and a visual stream for each speaker and, upon associating these streams with each other, form an association stream. Then, the attention control module on the basis of these streams effects attention control, thereby making a plan of the course in which to control the drive motor in the motor control module.

The term "attention" as used herein is intended to causing the robot to pay attention auditorily and/or visually to an object speaker. Likewise, the term "attention control" as used herein is intended to refer to the motor control module causing the robot to change its position and/or direction or orientation and thereby to pay attention to the object speaker.

Thus, the attention control module directs the robot to face towards an object speaker by controlling the drive motor in the motor control module on the basis of the plan made. Thus, directing the robot to face opposite to the object speaker allows the audition module to collect through the microphones a voice of the object speaker in the front direction in which the voice can be collected at a high S/N ratio and thereby to locate the object speaker accurately, while at the same time permitting the vision module to take through the camera a clear-cut image of that object speaker.

Also, even when either its auditory or visual event is missing or broken off, an object speaker can be perceived by the attention control module on the basis of only its visual or auditory event that remains extant, thereby permitting the motor control module to be controlled in real time.

Accordingly, making the audition module, the vision module and the motor control module to cooperate with the association module and the attention control module allows the ambiguities which the audition and vision of the robot individually possess to complement each other, thereby rising the so-called robustness of the system. Moreover, more than one speakers can be thereby individually perceived.

Further, displays are included to display at least a portion of the auditory information by the audition module, the visual information by the vision module and the motor information by the motor control module and to visualize the real-time processing by the association module, thereby permitting the status of the real-time processing to be instantly perceived by vision.

If the display includes an auditory display for displaying as the auditory information, a spectrum of sound signals from sound sources and peaks extracted therefrom and the auditory event, and if the auditory display is adapted to display the auditory event in the form of a circle with its center representing the robot, its axis of ordinates representing relative angles of the direction that the robot may face, its axis of abscissas representing pitches and its diameter representing a belief factor, the auditory information can be seized instantly by seeing the auditory display.

If the display includes a visual display for displaying the visual information, an image of an extracted face taken by the camera and shown within a frame, and the visual event, and if the visual display is adapted to display the visual event in the form of list of face identifications and face locations extracted with degrees of firmness, the visual information can be seized instantly by seeing the visual display.

If the display includes a motor display for displaying as the motor information, the direction in which and the speed at which the robot moves, three-dimensionally in real time, the motor information can be seized instantly by seeing the motor display.

If the display includes a stream display for displaying as the stream information, a stream chart and a radar chart, if the stream display is adapted to display in the stream chart, the auditory, visual and association streams constituting the stream information, and if the stream display is adapted to display in the radar chart, an instantaneous status of the streams with a visual field of the camera and upon sound source location, an instantaneous status of the streams and changes in their states can be seized instantly by seeing the stream display.

In this way, dealing with events and streams, each symbolic, used to represent auditory and visual information allows displaying in real time in the display since the amount of data can be largely compressed compared with dealing with unsymbolized sound and image data.

The fourth object mentioned above is achieved in accordance with the present invention in a fourth aspect thereof by a visuoauditory system for a robot, characterized in that it comprises: an audition module including at least a pair of microphones for collecting external sounds; a vision module including a camera for taking an image in front of the robot; a motor control module including a drive motor for turning the robot horizontally, an association module for combining events from the said audition module, the said visual module and the said motor control module to produce streams; and an attention control module for effecting attention control on the basis of streams produced by the association module, whereby: the said audition module in response to sound signals from the microphones is adapted to extract pitches therefrom, separate their sound sources from each other and locate sound sources such as to identify a sound source as at least one speaker, thereby extracting an auditory event; the vision module on the basis of an image taken by the camera is adapted to identify by face, and locate, each such speaker, thereby extracting a visual event therefor; the motor control module in response to a rotary position of the drive motor is adapted to extract a motor event therefrom; the association module on the basis of the auditory event from the audition module, the visual event from the vision module and the motor event from the motor control module is adapted to form an auditory stream and a visual stream and then associate these streams with each other to form an association stream; and the attention control module in effecting the attention control is adapted to make a plan for a course in which to control the drive motor in the motor control module in accordance with the streams, thereby effecting a visuoauditory servo for the robot.

In this robot visuoauditory system according to the present invention, when the attention control module effects the attention control, higher priority is preferably given in the order of the association stream, the auditory stream and the visual stream.

In this robot visuoauditory system according to the present invention, such priority may be altered according to circumstances.

In this robot visuoauditory system according to the present invention, the said attention control module in the existence of more than one auditory or visual streams is preferably adapted to select from them one auditory or visual stream according to circumstances, and to form an association stream, thereby effecting the attention control on the basis of such an auditory, visual or association stream.

The system so configured as mentioned above allows the audition module to extract pitches from sounds collected by the microphones from external objects as sound sources by using a harmonic structure thereof to find and identify the direction in which each of the sound sources as individual speakers lies, thereby extracting an auditory event for each object speaker.

Also, the vision module on the basis of an image taken by a camera is allowed to identify by face, and locate, each such speaker, thereby extracting a visual event therefor.

Further, the motor control module is allowed to extract a motor event by detecting the direction in which the robot faces on the basis of all the rotary position of the drive motor for turning the robot horizontally.

At this point it should be noted that the term "event" as used herein is intended to refer to the occurrence that at a given point of time, a sound or face is detected or a feature such a pitch and its direction is extracted to identify, recognize or discriminate the speaker or face, or the state that the drive motor is in rotation. The term "stream" as used herein is intended to refer to events interconnected so as to continue with time while effecting error correction.

Here, the association module on the basis of an auditory, a visual and a motor event thus extracted, respectively, forms an auditory and a visual stream for each speaker and, upon associating these streams with each other, form an association stream. Then, the attention control module on the basis of the association stream effects attention control, thereby making a plan of the course in which to control the drive motor in the motor control module.

The term "attention" as used herein is intended to causing the robot to pay attention auditorily and/or visually to an object speaker. Likewise, the term "attention control" as used herein is intended to refer to the motor control module causing the robot to change its position and/or direction or orientation and thereby to pay attention to the object speaker.

Thus, the attention control module directs the robot to face towards an object speaker by visuoauditorily servo-controlling the drive motor in the motor control module on the basis of the plan made. Thus, directing the robot to face opposite to the object speaker allows the audition module to collect through the microphones a voice of the object speaker in the front direction in which the voice can be collected at a high sensitivity and thereby to locate the object speaker accurately, while at the same time permitting the vision module to take through the camera a clear-cut image of that object speaker.

Here, with the association control module which is designed to effect attention control on the basis of association streams using both auditory and visual information and thus to servo-control it visuoauditorily upon recognizing the fact that a voice and a face (image) are derived from an identical object, it is possible to servo-control the robot with accuracy higher than in the conventional auditory or visual servo system relying on either auditory or visual information only.

Thus, the visuoauditory servo-control system of the invention in which the audition, vision and motor control modules are made to cooperate with the association and attention control modules allows the ambiguities which the audition and vision of the robot individually possess to complement each other, thereby rising the so-called robustness of the system. Moreover, more than one speakers can be thereby individually perceived.

A robot visuoauditory system according to the present invention can be incorporated into humanoid robots and various animaloid robots as well a variety of plantoid (plant-type) robot. In addition, it can be incorporated widely into active electronic machines which are automatically controlled, such as a robot not with any figurative but with an abstractive form.

In this way, dealing with events and streams, each symbolic, used to represent auditory and visual information allows displaying in real time in the display since the amount of data can be largely compressed compared with dealing with unsymbolized sound and image data.

BRIEF DESCRIPTION OF THE DRAWINGS

The present invention will better be understood from the following detailed description and the drawings attached hereto showing certain illustrative embodiments of the present invention. In this connection, it should be noted that such forms of embodiment illustrated in the accompanying drawings hereof are intended in no way to limit the present invention but to facilitate an explanation and understanding thereof. In the drawings:

FIG. 9 is an enlarged block diagram illustrating the electrical makeup of an association module shown at Block 5 in FIG. 4;

FIG. 10 is a diagram illustrating an example of the operation of a robot working as a party receptionist with the robot visuoauditory system of FIG. 4;

FIG. 11 is a diagram illustrating examples of images which viewers for the vision modules display on their screen in the robot visuoauditory system of FIG. 4;

FIG. 15 is a diagram illustrating an example of the operation of the robot working as a companion robot with the robot visuoauditory system of FIG. 4;

FIG. 16 is a diagram illustrating examples of what a radar chart (A), a stream chart (B) and camera images (C) may exhibit, respectively, at various time instants when the companion robot operates with the robot visuoauditory system of FIG. 4.

BEST MODES FOR CARRYING OUT THE INVENTION

Figure 1:
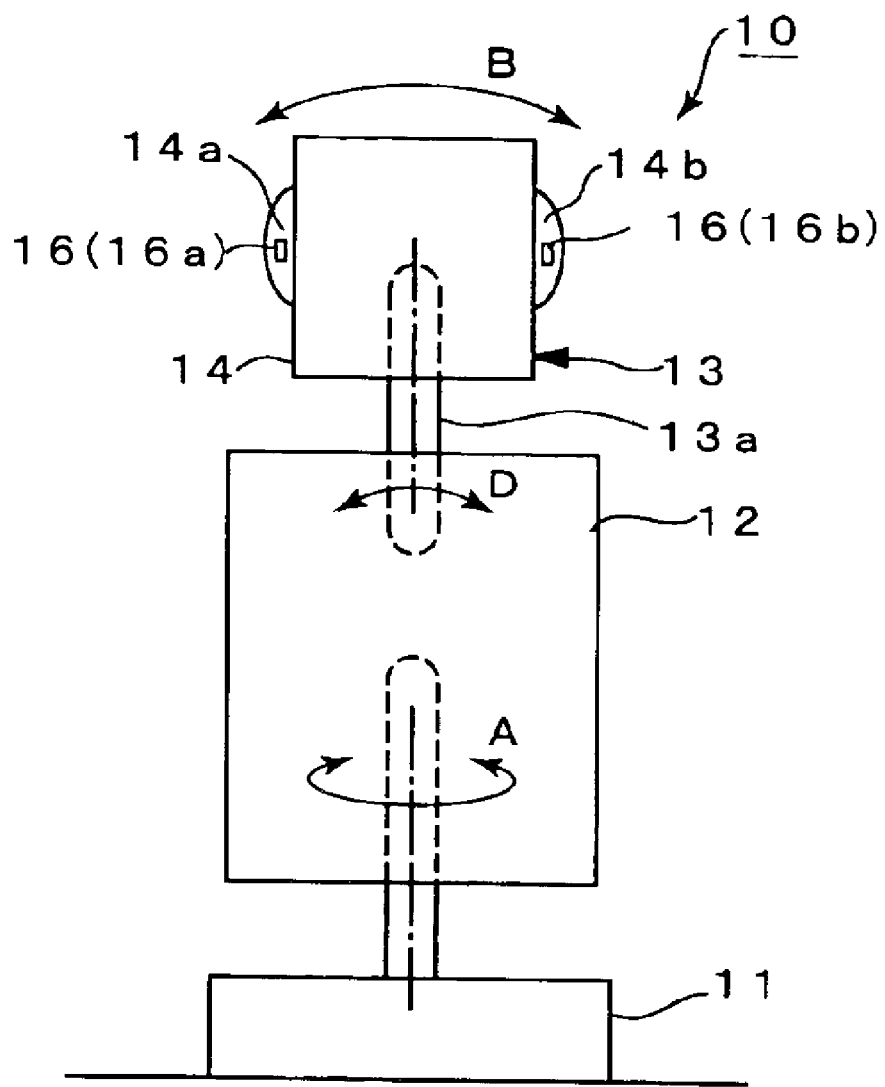
FIG. 1 is a front elevational view illustrating the appearance of a humanoid robot incorporating a robot visuoauditory system that represents one form of embodiment of the present invention.

Hereinafter, an explanation in detail is given in respect of suitable forms of embodiment of the present invention with reference to the drawing figures.

FIGS. 1 to 4 in combination show an overall makeup of an experimental human-type robot or humanoid incorporating a robot visuoauditory system according to the present invention as one form of embodiment thereof.

In FIG. 1, the humanoid indicated by reference character 10 is shown made up as a robot with four degrees of freedom (4DOFs) and including a base 11, a body portion 12 supported on the base 11 so as to be rotatable uniaxially about a vertical axis, and a head portion 13 supported on the body portion 12 so as to be capable of swinging triaxially (about a vertical axis, a lateral horizontal axis extending from right to left or vice versa and a longitudinal horizontal axis extending from front to rear or vice versa).

The base 11 may either be disposed fixed in position or arranged operable as a foot of the robot. Alternatively, the base 11 may be mounted on a movable carriage or the like.

The body portion 12 is supported rotatably relative to the base 11 so as to turn about the vertical axis as indicated by the arrow A in FIG. 1. It is rotationally driven by a drive means not shown and is covered with a sound insulating cladding as illustrated.

Figure 2:
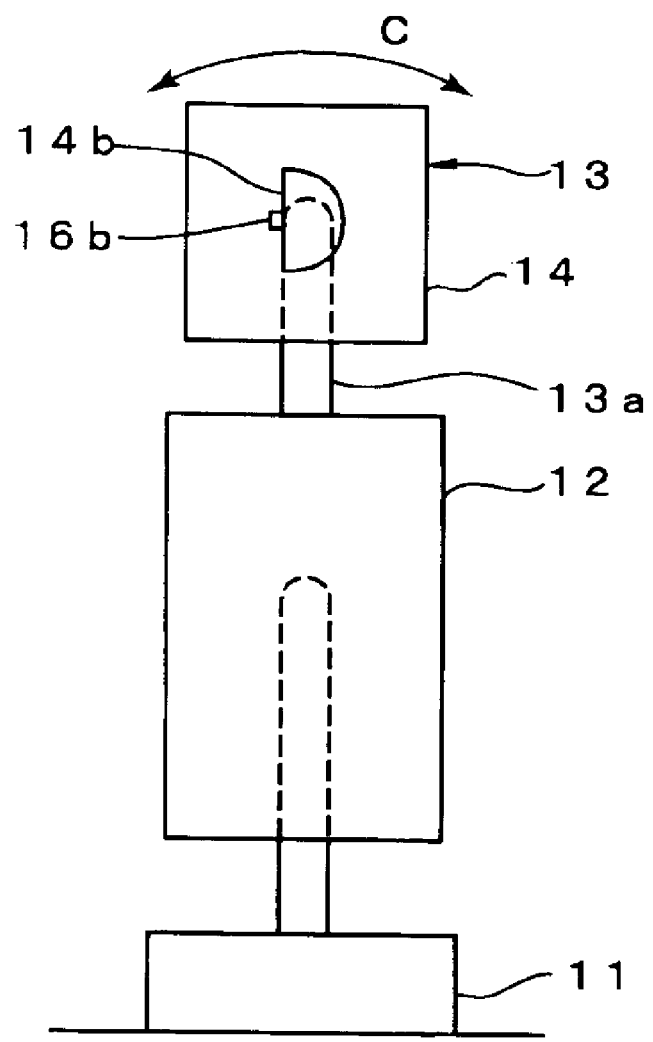
FIG. 2 is a side elevational view of the humanoid robot shown in FIG. 1.

The head portion 13 is supported from the body portion 12 by means of a connecting member 13a and is made capable of swinging relative to the connecting member 13a, about the longitudinal horizontal axis as indicated by the arrow B in FIG. 1 and also about the lateral horizontal axis as indicated by the arrow C in FIG. 2. And, as carried by the connecting member 13a, it is further made capable of swinging relative to the body portion 12 as indicated by the arrow D in FIG. 1 about another longitudinal horizontal axis extending from front to rear or vice versa. Each of these rotational swinging motions A, B, C and D for the head portion 13 is effected using a respective drive mechanism not shown.

Figure 3:
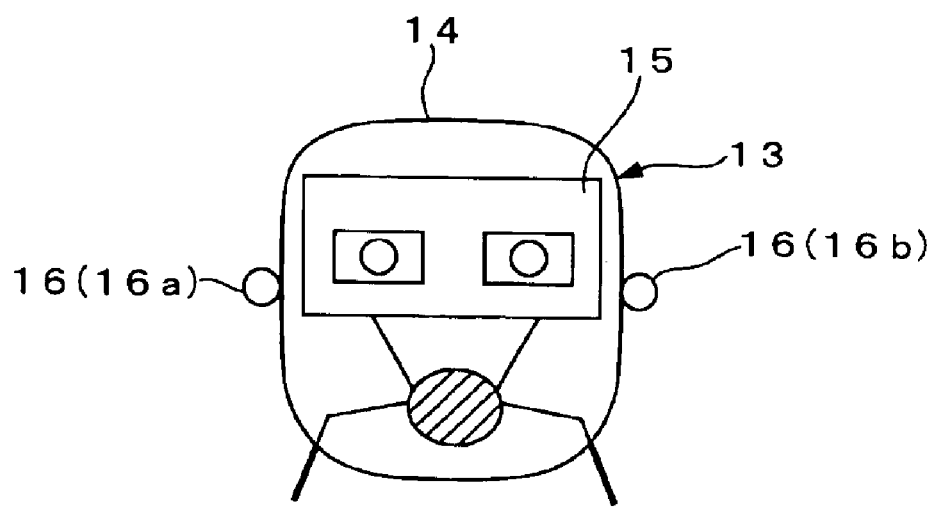
FIG. 3 is an enlarged view diagrammatically illustrating the makeup of the head portion of the humanoid robot shown in FIG. 1.

Here, the head portion 13 as shown in FIG. 3 is covered over its entire surface with a sound insulating cladding 14 and at the same time is provided at its front side with a camera 15 as the vision means in charge of robot's vision and at its both sides with a pair of microphones 16 (16a and 16b) as the auditory means in charge of robot's audition or hearing.

The cladding 14 is composed of a sound absorbing synthetic resin such as, for example, urethane resin and with the inside of the head portion 13 covered virtually to the full is designed to insulate and shield sounds within the head portion 13. Likewise, the body portion 12 is covered with a cladding made of such a sound absorbing synthetic resin.

The camera 15 may be of a known design, and thus any commercially available camera having three DOFs (degrees of freedom): so-called panning, tilting and zooming functions is applicable here.

The microphones 16 are attached to the head portion 13 so that in its side faces they have their directivity oriented towards its front. Here, the right and left hand side microphones 16a and 16b as the microphone set 16 as will be apparent from FIGS. 1 and 2 are mounted inside of, and thereby received in, stepped bulge protuberances 14a and 14b, respectively, of the cladding 14 with their stepped faces having one or more openings and facing to the front at the both sides and are thus arranged to collect through these openings a sound arriving from the front. And, at the same time they are suitably insulated from sounds interior of the cladding 14 so as not to pick up such sounds to an extent possible. This makes up the microphones 16a and 16b as what is called a binaural microphone. It should be noted further that the cladding 14 in the areas where the outer microphones 16a and 16b are mounted may be shaped so as to resemble human outer ears.

Figure 4:
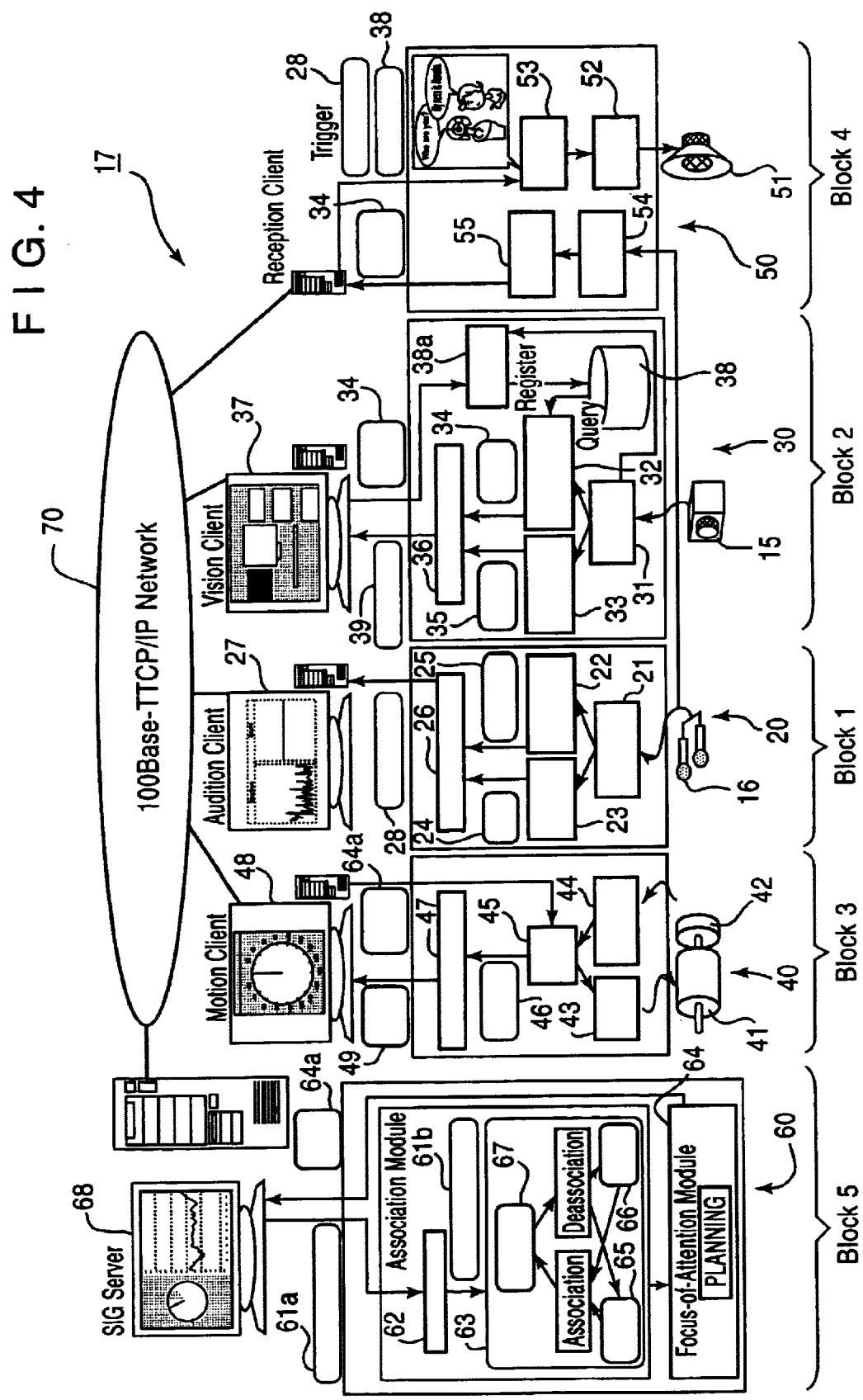
FIG. 4 is a block diagram illustrating the electrical makeup of a robot visuoauditory system for the humanoid robot shown in FIG. 1.

FIG. 4 shows the electrical makeup of a visuoauditory system including the microphone 16 and the camera 15. Referring to FIG. 4, the visuoauditory system indicated by reference character 17 is here configured for a robot serving as a party receptionist and companion and is made up of an audition module 20, a vision module 30, a motor control module 40, a interactive module 50 and an association module 60.

Referring next to FIGS. 5 to 9 which show these modules as enlarged, a further explanation of the robot visuoauditory system is given. For the sake of convenience of the description, the audition module 20, the visual module 30, the motor control module 40, the interactive module 50 and the association module 60 are shown as enlarged, and indicated by blocks 1, 2, 3, 4 and 5, in FIGS. 5, 6, 7, 8 and 9, respectively.

Here, the association module 60 (block 5 in FIG. 9) is made up of a server of a client-server system while the other modules, namely the audition module 20 (block 1 in FIG. 5), the visual module 30 (block 2 in FIG. 6), the motor control module 40 (block 3 in FIG. 7), and the interactive module 50 (block 4 in FIG. 8) are made up of respective clients in the system to operate asynchronously with each other. The server and the clients are each made up of, e. g., a personal computer and LAN connected with each other via a network 70 such as 100Base-T according to, e.g., TCP/IP protocol.

Further, each of the modules 20, 30, 40, 50 and 60 is distributed hierarchically into, specifically from bottom to top, a device layer, a processing layer, a characterizing layer and an event layer.

Figure 5:
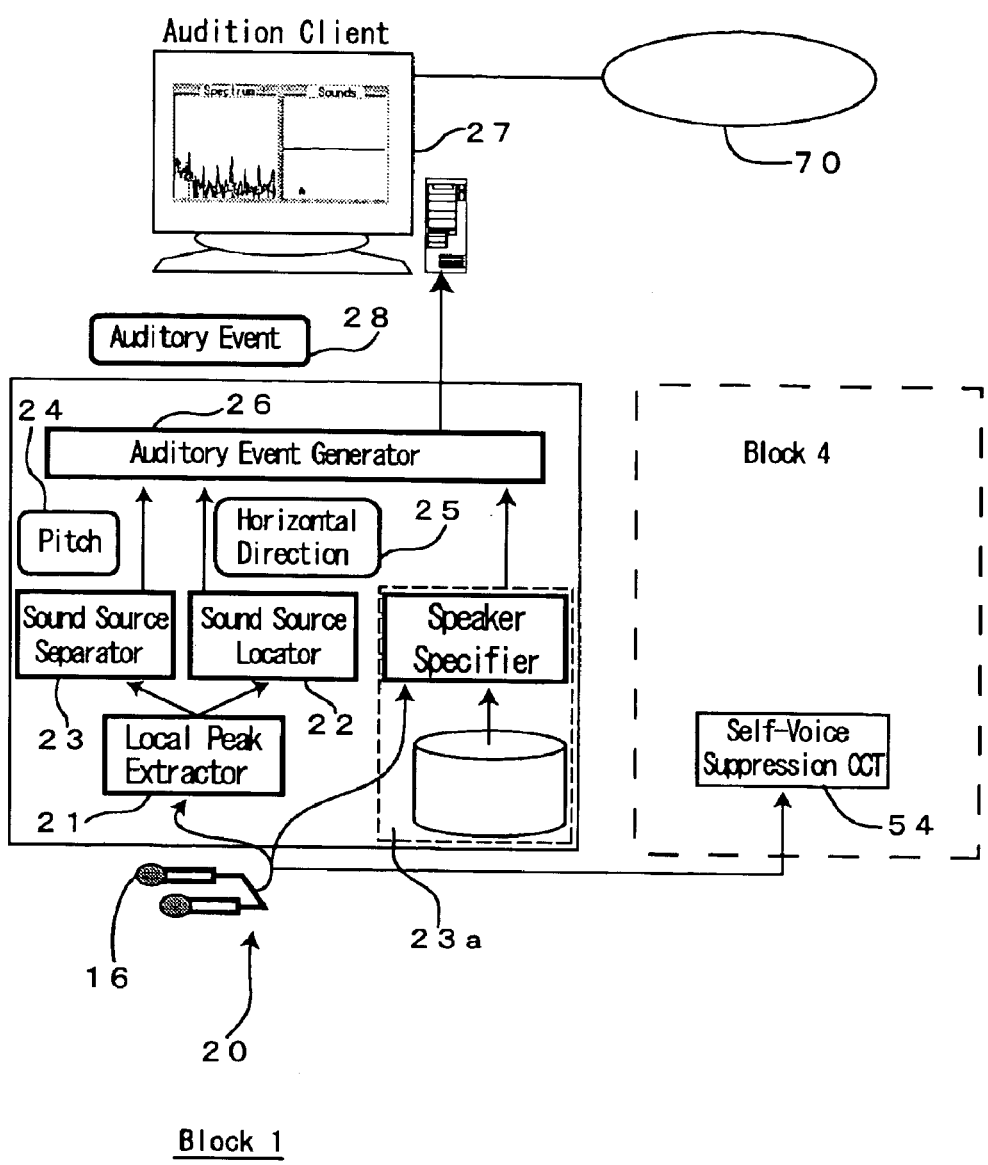
FIG. 5 is an enlarged block diagram illustrating the electrical makeup of an audition module shown at Block 1 in FIG. 4.

As shown in FIG. 5, the audition module 20 comprises the microphone 16 as the device layer, a peak extractor 21, a sound source locator 22, a sound source separator 23 and a speaker specifier 23a as the process layer, a pitch 24 and a horizontal direction 25 as the characterizing layer (data), and an auditory event generator 26 and a viewer 27 as the event layer.

Figure 13:
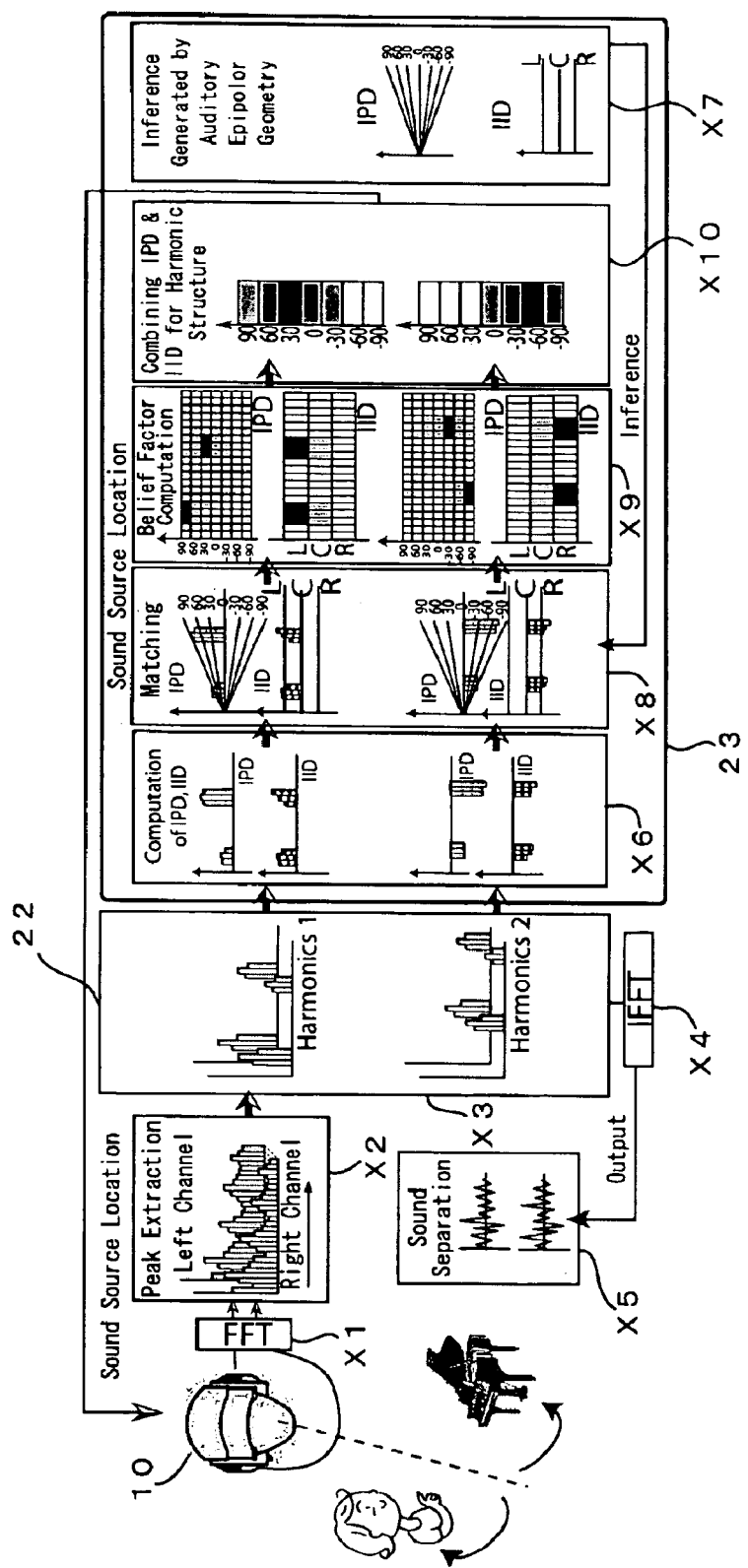
FIG. 13 is a diagram illustrating the peak extraction, the sound source location and the sound source separation by the audition module in the robot visuoauditory system of FIG. 4.

Here, the audition module 20 acts as shown in FIG. 13. Referring to FIG. 13, the audition module 20 as indicated by reference lettering X1 receives a sound signal picked up from the microphone 16 and sampled, e.g., at 48 kHz and with 16 pitches, and as indicated by reference lettering X2 performs its frequency analysis by FFT (Fast Fourier Transformation) to form its spectrum for each of the left and left channels as indicated by reference lettering X3. Then, the audition module 20 at its peak extractor 21 extracts a series of peaks for each of the left and right channels whereby identical or resembling peaks between the left and right channels are paired.

Here, the peak extraction is carried out using a band-pass filter that transmits only the data for those local peaks which are higher in power than a threshold value and of frequencies, e.g. between 90 Hz and 3 kHz, such as to exclude low-frequency noises and a high-frequency band. The threshold value here is defined upon measuring background noises and further as a value having a sensitivity parameter added thereto that is, e.g., 10 dB.

And, the audition module 20 utilizing the fact that each peak has a harmonic structure associated therewith extracts local peaks having their harmonic structures by turns from the local peak whose frequency is the lowest. Then, as indicated by reference lettering X4 the sound source separator 23 applies IFFT (Inverse Fast Fourier Transformation) to a set of the extracted peaks as a sound to separate from the mixed sound from various sound sources, a sound signal for each of the sound sources as indicated by reference lettering X5. Whereupon, the audition module 20 at its sound source specifier 22 as indicated by reference lettering X6 selects those sound signals from the left and right channels which are of an identical frequency to find both an IPD (Interaural Phase Difference) and an IID (Interaural Intensity Difference), e.g., at intervals of five degrees.

Then, the audition module 20 at its sound source localizer 22, utilizing the so-called auditory epipolar geometry to make an IPD-Ph hypothesis to hypothetical inference in a range of ±90° with the front of the robot 10 assumed to be 0°, computes a distance $d(\theta)$ between a separated sound and each hypothesis by way of the equation (1) given below.

$$d(\theta) = \frac{1}{n_{f<1.5 \text{ KHz}}} \sum_{f=FO}^{1.5 \text{ KHz}} \frac{(P_h(\theta, f) - P_s(f))^2}{f} \quad (1)$$

where $n_f$<1.5 kHz, which are the harmonics whose frequencies are less than 1.5 kHz. They were so set in this experiment in view of the fact that IDP for the left and right hand side microphones 15 from the base line was found effective to frequencies less than 1.2 to 1.5 kHz.

IID like IPD can be found a difference in power between the left and right hand side microphones for each harmonic of the separated sound. As for the IID, however, which of the left and right hand sides has the sound source found on is determined not using the hypothetical assumption but the discriminant function (2) given below.

$$I = \sum_{f=1.5 \text{ KHz}}^{3 \text{ KHz}} I_S(f) \quad (2)$$

That is, with the IID of each harmonic of frequency f expressed by Is(f), if I is positive, then the sound source is determined to lie on the left hand side of the robot. If I is negative, it is determined to lie on the right hand side of the robot. If I is zero, it is determined to lie in the front of the robot.

Here, since the hypothetical making of IID, which requires enormous amounts of computation with the shape of the head of the robot 10 taken into account, is impractical for real-time processing and is not adopted here as it was done for the IPD.

Then, the matching of the difference between IPD and IID is effected as indicated by reference lettering X8.

Thereafter, the sound source locater 22 in the audition module 20 computes the belief factor $BF_{IPD}(\theta)$ of the IPD from the distance $d(\theta)$ by applying thereto the probability density function defined below $$BF_{IPD}(\theta) = \int_{-\infty}^{\frac{d(\theta)-m}{\sqrt{\frac{s}{n}}}} \frac{1}{\sqrt{2\pi}} \exp\left(-\frac{x^2}{2}\right) dx \quad (3)$$

where m and s are the mean and variance of $d(\theta)$, respectively, and n is the number of distances d.

Also, the belief factor $BF_{IID}(\theta)$ of the IID is found to be 0.35 and 0.65 where 30°<θ≦90° and if the I is the plus and the minus, respectively. It is found to be 0.5 and 0.5 where −30°<θ≦30° and if the I is the plus and the minus, respectively. It is found to be 0.65 and 0.35 where −90°≦θ<−30° if the I is the plus and the minus, respectively.

The IPD's Brief factor $BF_{IPD}(\theta)$ and the IID's Brief factor $BF_{IID}(\theta)$ derived in this way are combined by the equation (4) given below according to the Dempster-Shafer theory to make a new firmness of belief $BF_{IPD+IID}(\theta)$.

$$BF_{IPD+IID}(\theta) = BF_{IPD}(\theta)BF_{IID}(\theta) + (1-BF_{IPD}(\theta))BF_{IID}(\theta) + BF_{IPD}(\theta)(1-BF_{IID}(\theta)) \quad (4)$$

Thus, the audition module 20 at its auditory event generator 26 makes an auditory event 28 from the list of upper 20 values of the firmness of brief $BF_{IPD+IID}(\theta)$ higher in the likelihood indicating the sound source and their indicating directions (θ) and the pitches.

On the other hand, the speaker specifier 23a may find the MFCC (Mel Frequency Cepstrum Coefficient) of a speaker, from the sound signals from the microphone 16 and compare the same with those of pre-registered speakers to identify who the speaker is.

Thus, the audition module 20 at its auditory event generator 26 makes an auditory event 28 from the list of upper 20 values of the firmness of brief $BF_{IPD+IID}(\theta)$ higher in the likelihood indicating the sound source and their indicating directions ($\theta$) and the pitches as well as the identification of the speaker.

In this way, the audition module 20 is designed to identify at least one speaker (speaker identification) to extract an auditory event thereof by extracting pitches from sound signals and separating and locating a sound source or extracting the pitches from the sound signals from the microphones 16 and separating and locating the sound source and upon MFCC comparison, and then to transmit the extracted auditory even via a network 70 to the association module 60. The abovementioned process in the audition module 20 is carried out at intervals of 40 milliseconds.

The viewer 27 is included to display on a client screen the auditory event formed as described above. Specifically, on a left hand side window of the screen may be displayed, e.g., with a black curve, the power spectrum of the auditory event 28 being measured. Its peaks may be displayed, e.g., with blue vertical lines. The levels of a background noise automatically measured may be displayed with a red curve. On a right hand side window of the screen may be displayed a graph of the auditory event 28 having the relative directional angles plotted along the ordinate and the pitches (frequencies) plotted along the abscissa. Here, each auditory event is represented with a circle having its diameter indicating the firmness of belief of locating a sound source. This permits an auditory event 28 to be perceived at once by seeing the viewer 27 displaying the extracted peaks, its power spectrum and the circle above the graph.

Figure 6:
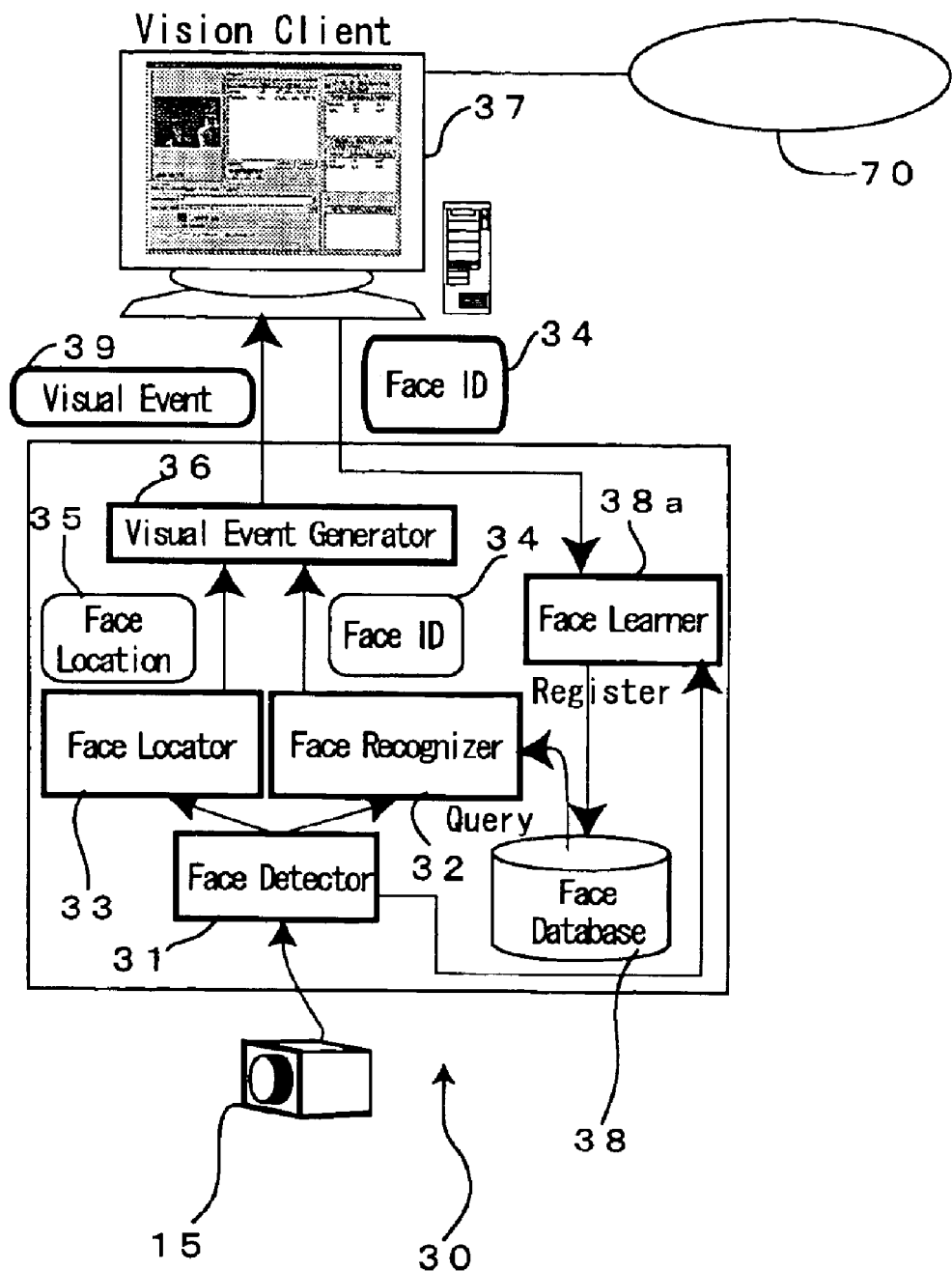
FIG. 6 is an enlarged block diagram illustrating the electrical makeup of a vision module shown at Block 2 in FIG. 4.

As shown in FIG. 6, the vision module 30 comprises a camera 15 as a device layer, a face detector 31, a face recognizer 32 and a face locator 33 each as a process layer, a face ID 34 and a face location 35 each as a characterizing layer (data), and a visual event generator 36 and a viewer 37 as an event layer. In this makeup of the vision module 30, the face detector 31 detects the face of each speaker, e.g., in terms of its skin color, on the basis of an image signal from the camera, the face recognizer 32 looks up the face in a pre-registered face data base 38 and, if an applicable face is found in the data base 38, identifies the face by its ID 34, and then the face locator 33 determines the direction 35 in which the identified face lies. If the face recognizer 32 fails to identify the face detected by the face detector 31 in the data base 38, then a face learner 38a enters it in the data base 38.

Here, if the face detector 31 detects a plurality of faces from the image signal, then the vision module 30 performs, for each of the faces detected, the process mentioned above, namely identifies and locates each face detected, followed by its tracking. Then, with the detected faces tending to change in their size, direction and brightness as often as not, the face detector 31 is here made capable of accurately detecting more that one faces within a time period of 200 milliseconds by matching patterns in combination on the basis of skin color extraction and correlative operations.

Further, the face recognizer 32 projects each face regional image detected by the face detector 31 in a discriminant space to compute its distance d from the face data pre-registered in the face database 38. Since this distance d is dependent on the number of registered faces (L), it is converted to a firmness of belief Pv that is independent of any parameter, by way of the equation (5) given below.

$$P_v = \int_{\frac{d^2}{2}}^{\infty} e^{-t} t^{\frac{L}{2}-1} dt \qquad (5)$$

Here, since the discriminant matrix that becomes the basis of the discriminant space can be renewed by a known online LDA (Linear Discriminant Analysis) with less computation than by the normal LDA, it is possible to register face data in real time.

The face locator 33 converts a face position in a two-dimensional image plane into that in a three-dimensional space. Assuming that a face comprises w x w pixels positioned at (x, y) in the image plane and having a width X and a height Y, the face position in the three-dimensional space is found as a set of the directional angle $\theta$ height $\phi$ and distance r given by equations (6), (7) and (8) as follows:

$$r = \frac{C_1}{w} \qquad (6)$$

$$\theta = \sin^{-1}\left(\frac{x - \frac{X}{2}}{C_2 r}\right) \qquad (7)$$

$$\phi = \sin^{-1}\left(\frac{\frac{Y}{2} - y}{C_2 r}\right) \qquad (8)$$

where C1 and C2 are constants defined by the size (X, Y) of search image, the angle of view of the camera and the size of the actual face.

Then, for each of the faces the vision module 30 at its visual event generator 36 makes a visual event 39 from the face ID (name) 34 and the face location 35. The visual event 39 specifically comprises the face ID (name) 34 and position (distance r, horizontal angle $\theta$ and vertical angle $\phi$) each with five upper values of the firmness of belief.

The viewer 37 is included to display the visual event and more specifically to display, as shown in FIG. 11, an image or picture 37a by the camera 15, a list 37b of the respective face IDs for the extracted faces and their positions, and a list 37c of the respective face IDs for the extracted faces, their values of firmness of belief and their distances, on the client's screen.

Here, in the image or picture 37a by the camera 15, a face detected and identified is displayed enclosed with a rectangular frame. As shown, more than one faces are detected and displayed enclosed with the rectangular frames 37d (colored, e.g., in red) and 37e (colored, e.g., in yellow), respectively, showing that they are each identified. Attendant thereon, the listing in the list 37b as shown is displayed for each of the faces detected and identified. This permits the visual event 39 to be instantly perceived by vision from the extracted faces displayed enclosed with the frames 37d and 37b, the face location list 37b and the list of the extracted face IDs with their values of firmness of belief, namely by seeing the display of the viewer 37.

Figure 7:
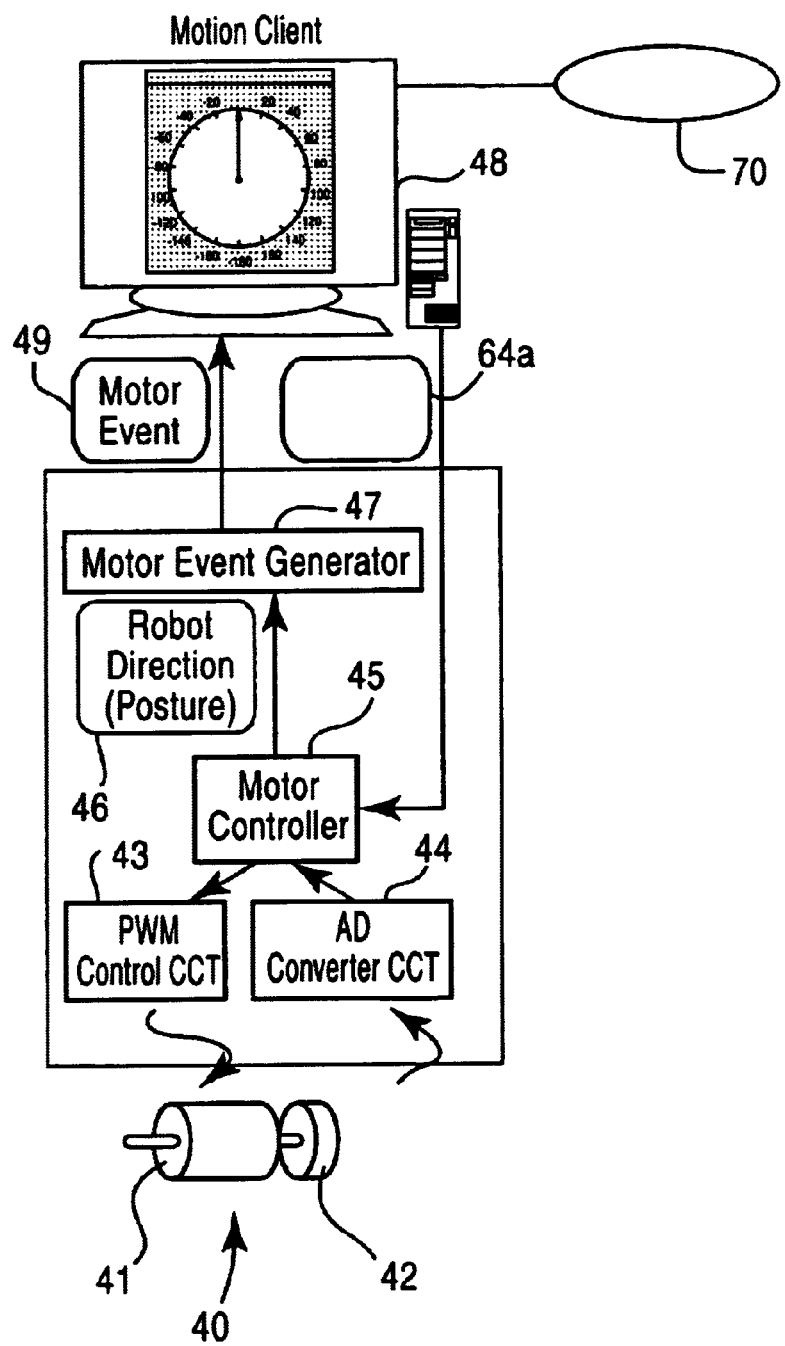
FIG. 7 is an enlarged block diagram illustrating the electrical makeup of a motor control module shown at Block 3 in FIG. 4.

As shown in FIG. 7, the motor control module 40 comprises a motor 41 and a potentiometer 42 as a device layer, a PWM control circuit 43, an AD converter circuit 44 and a motor controller 45 as a process layer, a robot direction 46 as a characterizing layer, a motor event generator 47 as an motor event layer, and a viewer 48.

In the motor control module 40 so constructed as mentioned above, the motor controller 45 in response to commands from an attention control module 64 (to be described later) controls driving of the motor 41 via the PW M control circuit 43, the potentiometer 42 detects a rotary position of the motor 41, the motor controller 45 via the AD converter 44 extracts a robot direction 46, and the motor event generator 47 makes a motor event 49 made of motor directional data.

Figure 12:
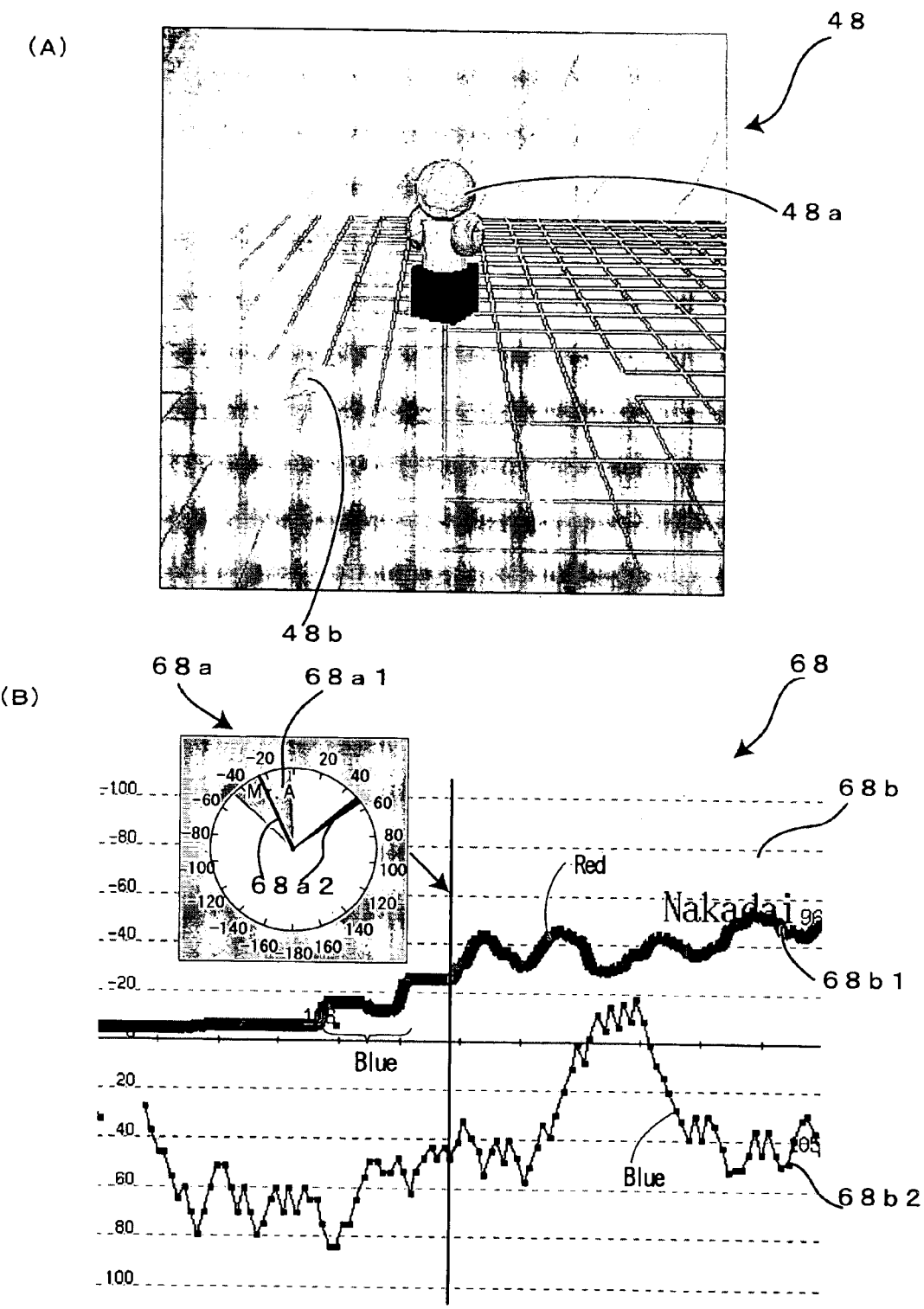
FIG. 12 is a diagram illustrating examples of images which viewers for the motor control and association modules display on their screens (A) and (B) in the robot visuoauditory system of FIG. 4, respectively.

The viewer 48 is used to display a motor event three-dimensionally on a client screen. More specifically, as shown in FIG. 12(A) use is made of a three-dimensional viewer equipped, e.g., in Open GL, to display in real time an orientation and a motion speed of the robot three-dimensionally in terms of a three-dimensionally represented orientation of the robot 48a, e., g., the orientation of an arrow 48b colored in red and a length of the arrow 48, respectively. In this manner, a three-dimensionally displayed motor event 49 of the robot 10 can be instantly perceived by vision by seeing the display of the viewer 48. The visual point on the robot 10 can be varied as desired and can also be zoomed both in and out.

Figure 8:
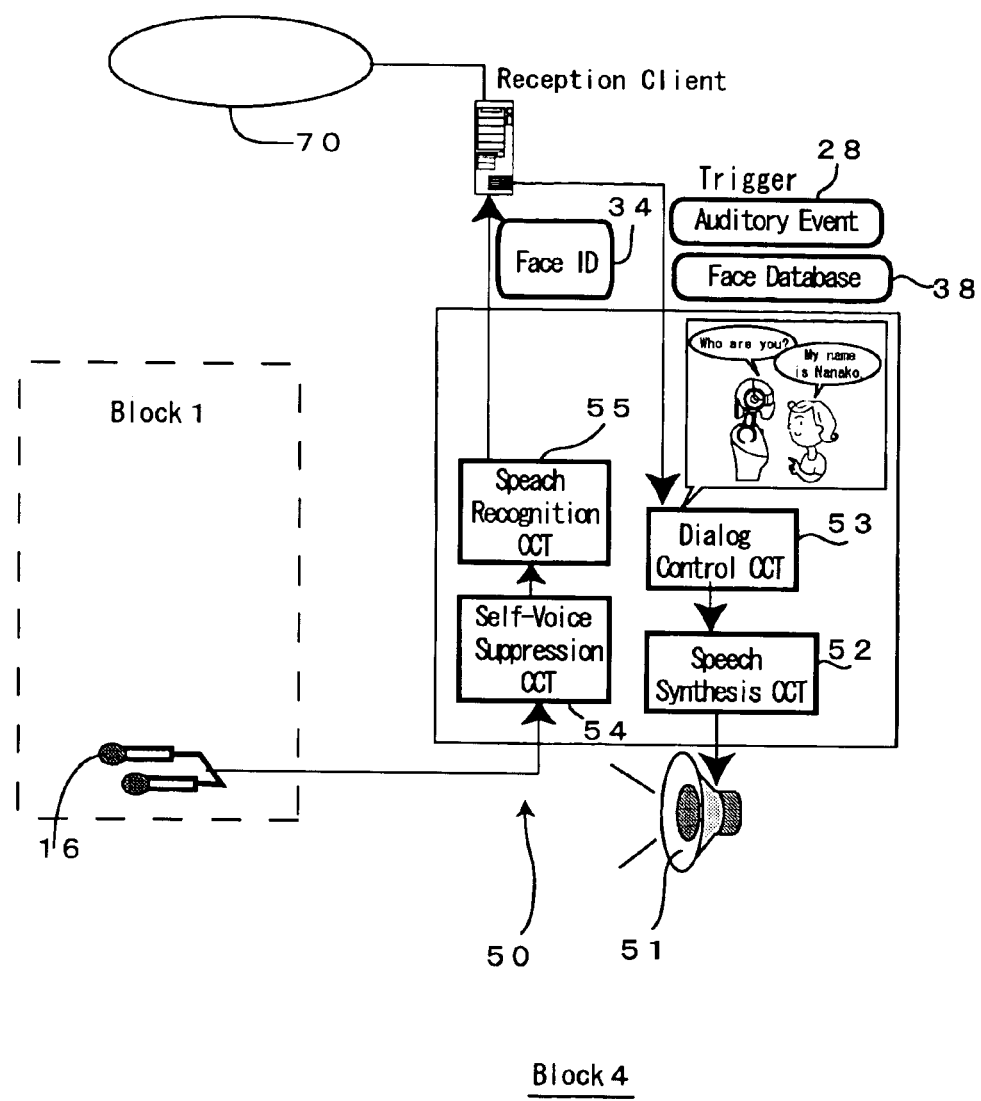
FIG. 8 is an enlarged block diagram illustrating the electrical makeup of an interactive module shown at Block 4 in FIG. 4

As shown in FIG. 8, the interactive module 50 comprises a speaker 51 and the microphone set 16 as a device layer, a speech (voice) synthesis circuit 52, a dialog control circuit 53 and a self-voice suppression circuit 54 as a process layer, and a speech (voice) recognition circuit 55. In the interactive module so constructed, the dialog control circuit 53 is controlled by the association module 60 to be described later, the speaker 51 is driven by the speech synthesis circuit 52 so that a given speech may be emitted to the target or object speaker. After the self-voice suppression circuit 54 eliminates the sound emitted from the speaker 51, from sound signals received from the microphone 16, the speech recognition circuit 55 recognizes a speech from the target or object speaker. The interactive module 50 as shown dispenses with the hierarchical characterizing and event layers.

Here, the robot when serving as a receptionist for a party has the highest priority to continue its current attention, but when serving as a companion for the party is controlled to give its attention to a stream most recently associated with.

As shown in FIG. 9, the association module 60 ranks hierarchically higher than the audition module 20, the vision module 30, the motor control module 40 and the interactive module 50, and constitutes a stream layer hierarchically higher than the event layers of those other modules 20, 30, 40, 50.

Specifically, the association module 60 comprises: a synchronizer circuit 62 for synchronizing asynchronous events 61a from the audition module 20, the vision module 30 and the motor control module 40, namely the auditory event 28, the visual event 39 and the motor event 49 into synchronous events 61b; a stream generator 63 for associating these synchronous events 61b with each other to make an audition stream 65, a vision stream 66 and an association stream 67; an attention control module 64; and a viewer 68.

While the synchronizer circuit 62 synchronizes the auditory event 28 from the audition module 20, the visual event 39 from the vision module 30 and the motor event 49 from the motor control module 40 to form an auditory, a visual and a motor event synchronized with each other, the auditory event 28 and the visual event 39 have their coordinate systems converted by the synchronized motor event into an absolute coordinate system.

Here, the delay time it takes after each event is actually observed until the event reaches the association module 60 via a network 70 is, e.g., 40 milliseconds for the auditory event 28, 200 milliseconds for the visual event 39, and 100 milliseconds for the motor event 49, apparently because of a delay of 10 to 200 milliseconds occurring in the network 70 and of their different arriving periods.

Thus, in order for them to be synchronized with each other, the auditory event 28, the visual event 39 and the motor event 49 from the audition module 20, and vision module 30 and the motor control module 40 are each provided with an time stamp information indicating the observed time, which is once stored in a short term memory circuit (not shown) for a time period, e.g., 2 seconds.

The synchronizer circuit 62 is thus provided with a delay time of 500 milliseconds set with the abovementioned delay times taken into account and upon comparison with an actual time of observation, and by synchronization processing takes out each event stored in the short term memory circuit. The synchronization processing is designed to occur in a period of, e.g., 100 milliseconds. Since the events may arrive at the association module 60 asynchronously with each other, an event does not necessarily exist that is concurrent with the time of observation set for synchronization. Accordingly, the synchronization processing here is designed to make a linear interpolation for events taking place before and after the time of observation for synchronization.

Figure 14:
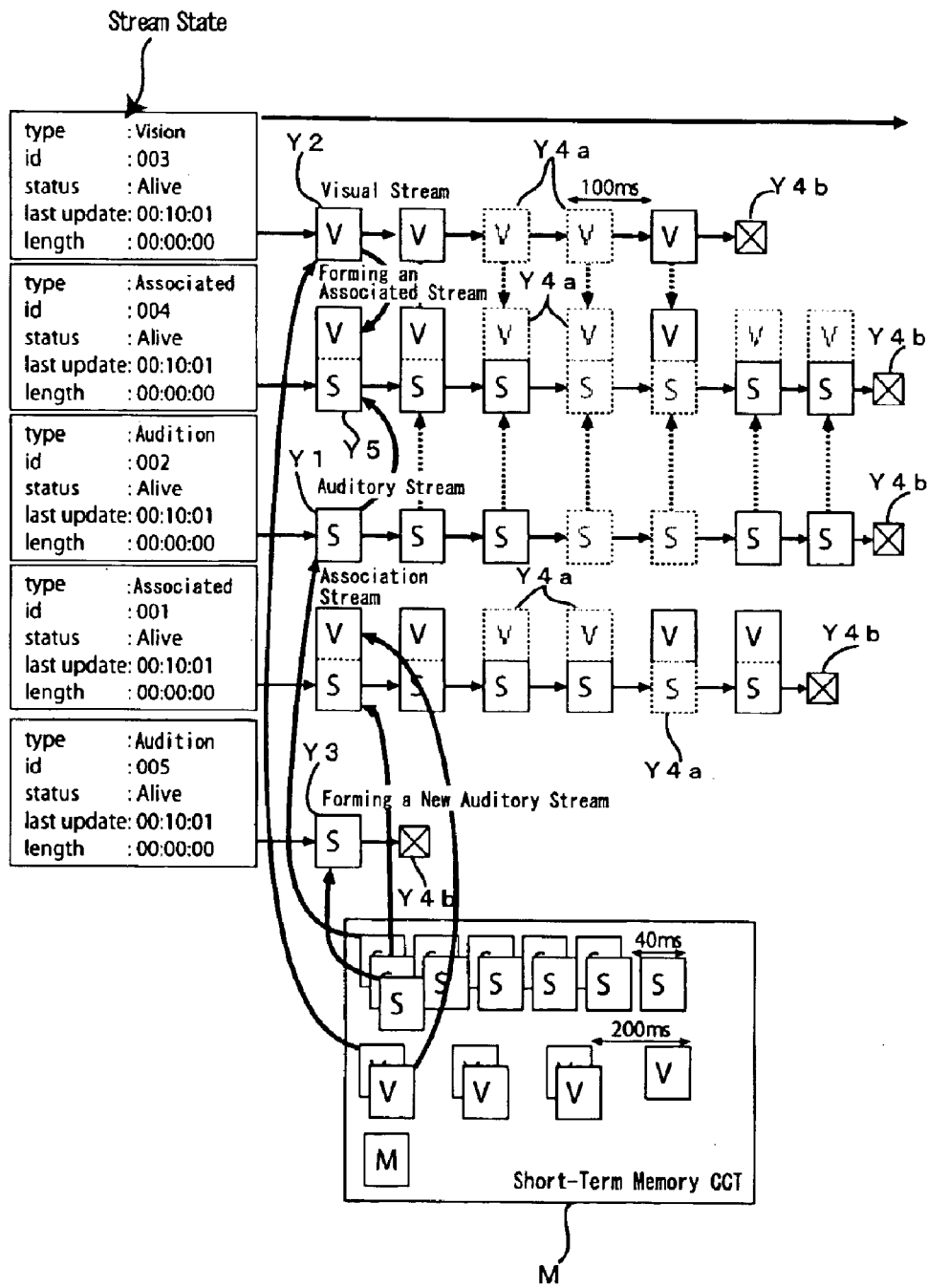
FIG. 14 is a diagram illustrating the process of forming streams by the association module in the robot visuoauditory system of FIG. 4.

The stream generator 63 as shown in FIG. 14 reads out an auditory event S and a visual event V from the short term memory circuit M and makes streams 65, 66 and 67 under the conditions stated below.

1. An auditory event 28 as indicated by reference lettering Y1 is connected to an auditory stream 65 which is the closest to it as having a pitch that is equal to its frequency or is a harmonic of the frequency and whose direction lies in a range within ±10°. The range within ±10° is selected by taking into account the accuracy of the auditory epipolar geometry.

2. A visual event 39 as indicated by reference lettering Y2 is connected to a visual stream 66 which is the closest to it as having a common face ID 34 lying in a range within 40 cm. The range within 40 cm is selected under the assumption that a human object here will not move at a speed of 4 meters per second.

3. If the search done for all the streams shows that there is an event for which there exists no connectable stream 65 or 66, then the event 28, 39 comes to constitute a new stream 65, 66 as indicated by reference lettering Y3.

4. The already existing stream 65, 66 in the absence of an event 28, 39 connectable thereto is allowed to continue to exist for a maximum time period of 500 milliseconds as indicated by reference lettering Y4a, but if the state that the event cannot be connected continues thereafter, is then allowed to cease existing as indicated by reference lettering Y4b.

5. If the state that an auditory stream 65 and a visual stream 66 come close to each other within ±10° continues for a time period of 500 millimeters in 1 second, the auditory stream 65 and the visual stream 66 are regarded as being derived from an identical object speaker, and then as indicated by reference lettering Y5 are associated with each other to form an association stream 67.

6. The association stream 67 unless the auditory event 28 or the visual event 39 continues for 3 seconds or more, has them dissociated whereby only either the existing auditory stream 65 or the existing visual stream 66 continues to exist.

7. The association stream 67 if the auditory stream 65 and the visual stream 66 have their directional difference becoming ±30° or more has them dissociated from each other, thereby returning to their individual auditory and visual streams 65 and 66.

Thus, making an auditory stream 65 and a visual stream 66 based on an auditory and a visual event synchronized with each other by the synchronizing circuit 62, the stream generator 63 is designed to take a temporal link of such events into account to connect the synchronized auditory and visual events to an auditory stream 65 and a visual stream 66 of an identical speaker and then, if such streams 65 and 66 are strongly linked with each other, to make an association stream 67 upon associating them and, if the auditory and visual streams 65 and 66 constituting the association stream 67 become weakly linked with each other, to disassociate them.

Therefore, even if the object speaker is moving, it follows that its movement if in the angular limits preset as mentioned above can be predicted and tracked upon forming these streams 65, 66 and 67.

The attention control module 64 is designed to effect attention control required to make a plan for the drive motor control of the motor control module 40. Reference is then made preferentially to the association stream 67, the auditory stream 65 and the visual stream 66 in this order to effect the attention control.

The attention control module 64 makes a plan for the robot 10 to act according to how the auditory and visual streams 65 and 66 stand and whether the association stream is present and, if the drive motor 41 needs to be driven, transmits a motor event in the form of action commands via the network 70 to the motor control module 40.

Here, what the attention control by the attention control module 64 gives is either to continue or to trigger; the former let the robot attend to tracking in an existing state and the latter let the robot attend to tracking an object that is then the most interesting.

Therefore, for the attention control:

1. In the existence of an association stream, which shows that a person speaking while standing opposite to the robot 10 either exists currently or existed in the immediate past, the attention must be directed at a high priority to such a person for its tracking.

2. Since the microphone 16 is non-directional and thus is much free from such detectable limits as visual field angles of a camera, higher priority should be given to the auditory stream than to the visual stream.

With these particulars taken into account, and also in accordance with the following general rule, a stream to which attention must be directed is selected and tracked.

1. Top priority is given an association stream for tracking.

2. In the absence of an association stream, priority should be given an auditory stream for tracking.

3. In the absence of both association and auditory streams, priority should be given the tracking of a visual stream.

4. If a plurality of streams of the same type exists, then oldest one of them should be preferentially tracked.

The attention control module 64 by effecting the attention control in this manner, makes a plan for the drive control of the motor 41 in the motor control module 40, forms motor commands 64a in accordance with the plan so made and transmits them to the motor control module 40 via the network 70. Then, in the motor control module 40, the motor controller 45 responding to the motor control commands 64a performs PWM control to rotationally drive the motor 41 so as to direct the robot 10 towards a given appropriate direction.

The viewer 68 is designed to display thus formed streams on a screen of the server. More specifically, as shown in FIG. 12(B) they are displayed in a radar chart 68a and a stream chart 68b. The radar chart 68a displays an instantaneous state of the association stream in terms of the visual field angles 68a1 of the camera shown by, e.g., a first fan-shape zone that is broad and bright (colored in pink as shown) and the direction of the stream 68a2 shown by, e.g., a second fan-shaped zone that is narrow and dark. The stream direction 68a2 here is displayed e.g., colored in red in the presence of both an auditory and a visual stream, colored in blue in the presence of only an auditory stream and colored in green in the presence of only a visual stream.

The stream chart 68b displays an association stream 68b1 indicated by a thick solid line and an auditory or visual stream 68b2 indicated by a thin solid line. The association stream 68b1 is displayed, e.g., colored in red in the presence of both an auditory and a visual stream, colored in blue in the presence of only an auditory stream and colored in green in the presence of only a visual stream. The stream 68b2 indicated by the thin solid line is displayed, e.g., colored in blue if it is an auditory stream and colored in green if it is an visual stream.

Thus, seeing the display of the viewer 68 allows the instantaneous auditory and visual stream to be perceived at once by vision from the radar chart 68a and the temporal flows of the visual and auditory streams to be instantly perceived by vision from the stream chart 68b. Also, the visual perception of a color of display that appears allows seizing readily what stream is being tracked in the attention control.

When the humanoid robot 10 in the illustrated form of implementation of the present invention so constructed and configured as described above serves as a receptionist robot for a party, it operates as described below with reference to FIG. 10.

First, the robot 10 as shown in FIG. 10(A) is disposed at the entrance of a party hall.

FIG. 10(B) shows that while a participant P is approaching the robot 10, the robot has not recognized the participant P. Here, if the participant P by saying, e.g., "Hello!" speaks to the robot 10, then the robot 10 has the microphone set 16 picking up the voice of the participant P, and the audition module 20 forming an auditory event 28 that identifies the direction of the voice (sound) source and transmitting it via the network 70 to the association module 60. Then, the association module 60 forms an auditory stream 65 in response to the auditory event 28. At this point of time, the vision module 30 forms no visual event since the participant P has not enter the visual field of the camera 15. As a consequence, the association module 60 forms only the auditory stream 65 in response to the auditory event 28 and triggers it through the attention control module 64 to effect an attention control such as to bring the robot 10's attention to the guest P.

In this way, the so-called tracking by voice is effected whereby the robot 10 is directed to turn its head towards the participant P as shown in FIG. 10(C). Next, the vision module 30 captures an image of the participant P's face by the camera 15 to form a visual event 39, searches the participant P's face from the face database 38 for its identification, and transmits the ID 34 of the identified face and its image to the association module 60 via the network 70. Then, if the participant P's face has not been registered in the face database 38, the vision module 30 communicates this to the association module via the network 70.

At this point of time, the robot 10 has an association stream 67 formed from the auditory event 28 and the visual event 39. Then, since the attention control module 64 in response to this association does not alter the attention control, the robot 10 keeps looking towards the participant P. Consequently, even if the participant P moves, the robot 10 with the motor control module 40 controlled by the association stream 67 tracks the participant P whereby the camera 15 in the vision module 30 is allowed to continue imaging the participant P. On the other hand, the association module 60 gives an input to the speech recognition circuit 55, and the latter in turn gives a result of the speech recognition to the dialog control circuit 53. The dialog control circuit 53 synthesizes a speech to cause it to be emitted through the speaker 51. Then, the speech recognition circuit 55 makes the robot 10 capable of recognizing a speech of the participant with an increased precision by disregarding its own utterance, namely by reducing through the self-voice suppression circuit 54 its own voice to be emitted from the speaker 51, from the sound signal from the microphone 16.

Here, speaking by speech synthesis differs dependent on whether or not the participant P's face has been registered in the face database 38. If the participant P's face has been registered in the face database 38, then the association module 60 on the basis of the face ID 34 from the vision module 30 may control the dialog module 50 to cause the latter to synthesize a speech such that the robot 10 may ask the participant P a question: "Good afternoon, Mr. XXX?"

Then, if the participant P answers "Yes", the dialog module 50 in response to the sound signal from the microphone 16 recognizes "Yes" by the speech recognition circuit 55 and causes the dialog control circuit 53 to synthesize a speech such that the robot may utter through the speaker 51: "Welcome to the party, Mr. (or Ms.) XXX. Come in to the hall, please."

If the participant P's face has not been registered in the database 38, the association module 60 acts on the dialog module 50 to cause it to synthesize a speech such that the robot may ask the participant P a question: "Good afternoon, may I have your name?"

Then, if the participant P answers "My name is XXX", the dialog module 50 in response to the sound signal from the microphone 16 recognizes "XXX" through the speech recognition circuit 55 and causes the dialog control circuit 53 to synthesize a speech such that the robot may utter through the speaker 51: "Welcome to the party, Mr. (or Ms.) XXX. Come in to the hall, please."

While the robot 10 in this manner makes recognition of the participant P and guides its entrance to the party hall, as shown in FIG. 10(D), in the vision module 30 it has the name and the face image of the participant P registered in the face database 38.

Should the humanoid robot 10 serve as a companion robot, it may operate as follows: Operable in response to an auditory event 28 from the audition module 20 and a visual event 39 from the vision module 30 and to an association stream 67 from the association module 60, the humanoid robot 10 is recognizing a plurality of object speakers by both audition and vision and is made also capable of tracking one of them selectively and switching from one of them to another midway of tracking.

The robot 10 when serving as a companion robot plays a passive role; it only "listens and looks" to the participants to the party, and does not speak to them by the dialog module 50.

The humanoid robot 10 as a companion robot may operate as described below with reference to FIG. 15.

First, the humanoid robot 10 having no particular well-defined scenario acts, e.g., to track one of four speakers who appear on stage in FIG. 15 and to switch its attention to another of them midway. And, its action can readily be seized and assessed by visually recognizing the displays on the viewers 27, 37, 48 and 68.

Here, what each of FIGS. 15(A) to 15(H) shows comprises a snapshot that appears in its upper left area, and displays of the viewers 68, 27 and 37a which appear in its upper right, lower left and lower right areas, respectively.

First, as shown in FIG. 15(A) the humanoid robot 10 detects through its vision module 30 the face of the leftmost speaker as the viewer 37a in the lower right hand side displays within its rectangular frame. Then, a visual event 39 for that speaker (the first speaker) in the stream chart 68b in the upper right hand side constitutes a visual stream indicated by the thin solid line 68b2.

Next, when the first speaker commences speaking, the audition module 20 detects an auditory event 28, which as shown in FIG. 15(B) is displayed as a small circle in the right hand side window on the viewer 27 in the lower left hand side of the Figure, and also from which a set of peaks of harmonics in its power spectrum is extracted in the left hand side window of the viewer. And, this auditory event 28 is converted in the association module 60 into an auditory stream, which is displayed as a narrow and dark fan 68a2 in the radar chart 68a on the viewer 68 in the upper right hand side.

Then, with the auditory stream 65 and the visual stream 66 formed by the association module 60 from the auditory event 28 and the visual event 39 for the first speaker and having a common direction over a fixed time period, an association stream 67 is formed at the stream generator 63 in the association module 60, which as shown in FIG. 15(C) is displayed in the form of a thick solid line in the stream chart 68b on the upper right hand side viewer 68. Attention control for the first speaker is now activated.

Thereafter, when the first speaker discontinues speaking as shown in FIG. 15(D), the abovementioned association stream is disassociated, the attention to the first speaker is defocused, and the attention control is interrupted.

Now, as the rightmost person begins to talk, attention is directed to this speaker. But, when the humanoid robot 10 is thus turning to face the speaker, this person ceases talking. Then, the vision module 30 happening to detect the face of a second from left person, the humanoid robot stops turning horizontally.

Then, as shown in FIG. 15(E) the second from left person begins to talk, an association stream for this speaker is formed and attention is directed to him.

Thereafter, as shown FIG. 15(F), that speaker stops talking, but its visual event 39 continually detected allows the association stream 67 to remain to exist for several seconds.

And then, as shown in FIG. 15(G), the association stream 67 vanishes and thereafter a third from left person commences talking. The humanoid robot 10 is turning to face this person. With the vision module 30 unable to detect this speaker, however, neither an visual event 39 nor an visual stream 66 therefore is formed; hence an association stream is not formed therefor.

Thereafter, as shown in FIG. 15(H) the leftmost (first) person begins talking again. Then, since the speaker has not been detected by the vision module 30 and thus neither a visual event 39 nor a visual stream 66 therefore is formed and further no association stream therefor is formed, the humanoid robot 10 triggered by the auditory event 28 is turning to face the first person.

In this way, the humanoid robot 10 on the basis of an auditory and a visual event 28 and 39 formed by the audition and vision modules 20 and 30, respectively, and an association stream 67 formed by the association module 60 is capable of auditorily and visually recognizing a plurality of speakers, selectively tracking one of them, and switching midway one from one speaker to another for tracking.

Figure 17:
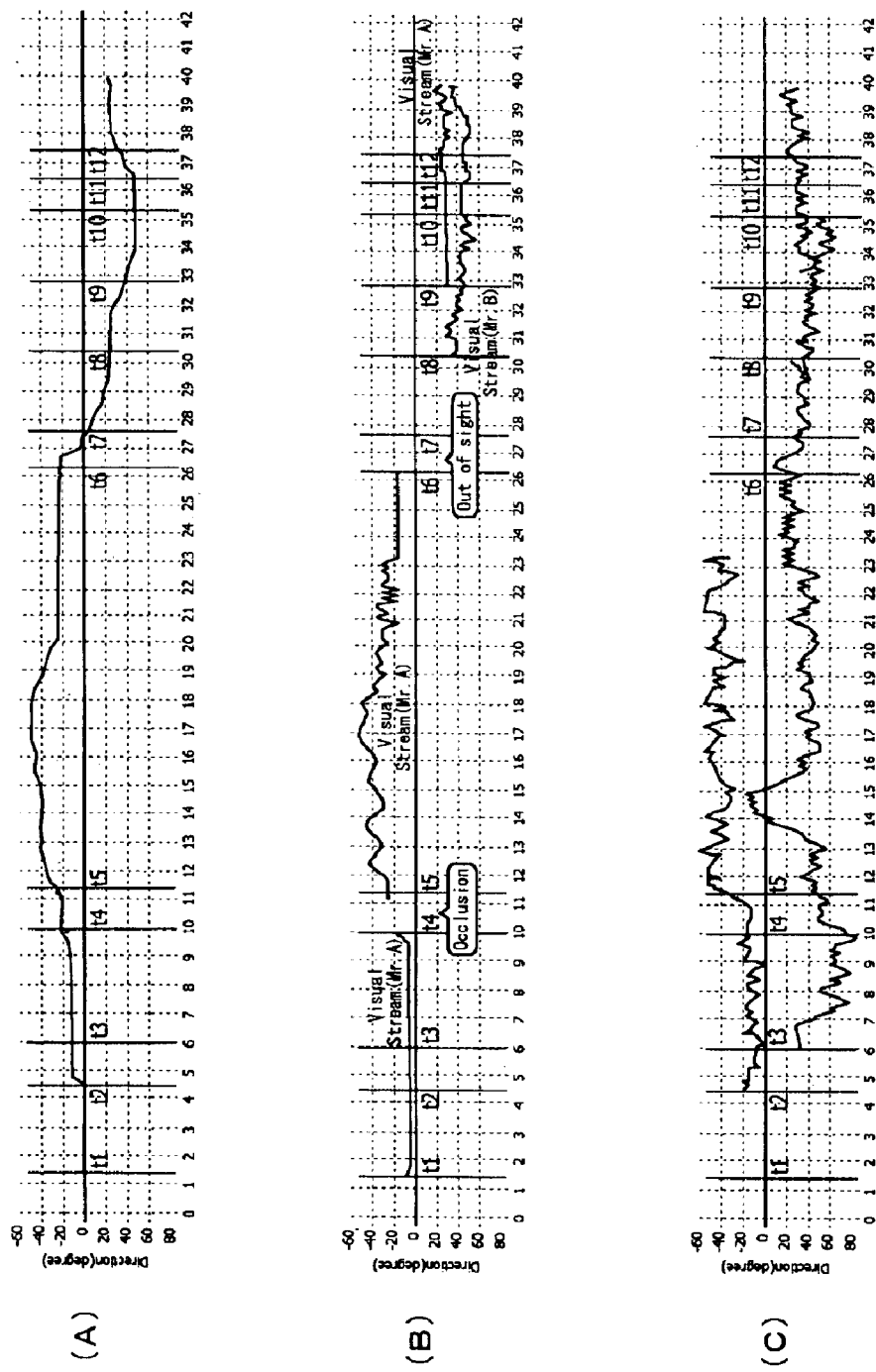
FIG. 17 is a graphic diagram illustrating how the robot is directed (A) and how the visual and auditory streams vary (B) and (C) in the example of operation shown in FIG. 16.

The humanoid robot 10 when serving as a companion robot may operate as described below with reference to FIGS. 16 and 17.

For the humanoid robot 10 having no particular well-defined scenario, use may be made of a scenario, e.g., as shown in FIG. 16, as a bench mark to assess the present system. FIGS. 17(A), 17(B) and 17(C) show the facing direction of the robot, tracking by a visual stream and tracking by an auditory stream, respectively.

In this scenario, two speakers A and B take a variety of actions for a time period of about 40 seconds. The scenario is specifically as flows:

At a time instant t1, Mr. A enters the visual field of the robot 10. The vision module 30 detects the face of Mr. A to form a visual event for him, and to cause a visual stream for him to be formed by the association module 60.

At a time instant t2, Mr. A begins to talk to the robot 10. The audition module 20 detects the voice of Mr. A to form an auditory event for him and to cause the association module 60 to form an auditory stream 65 and an association stream 67 for him. The visuoauditory servo of the robot is thereby actuated.

At a time instant t3, Mr. B begins to talk in the outside of the visual field of the robot 10. The audition module 20 detects the voice of (invisible) Mr. B to form an auditory event for him and to cause an auditory stream for him to be formed by the association module 60.

At a time instant t4, Mr. A upon moving hides himself into the shade. This causes the vision module 30 to cease forming the visual event for Mr. A and causes the visual stream for him to break off. The association stream remains to exist for a given time period.

At a time instant t5, Mr. A coming out of the shade again appears Then, the vision module 30 forms a visual event for Mr. A again and causes an association stream 67 for him to be again formed by the association module 60.

Thereafter, Mr. A stops talking, and again hides himself into the shade. Then, since the vision module 30 ceases forming the visual event for Mr. A and causes the visual stream for him to break off, the association stream 67 for him is disassociated and vanishes after a given time period.

At a time instant t7, the auditory stream is triggered to cause the robot 10 to turn towards Mr. B talking.

At a time instant t8, the robot 10 captures Mr. B in its visual field. The vision module 30 forms a visual event for Mr. B and causes a visual stream and an association stream 67 to be formed by the association module 60.

At a time instant t9, Mr. A while talking enters the visual field of the robot 10. The audition and vision modules 20 and 30 form an auditory and a visual event for Mr. A, and causes an auditory and a visual stream to be formed by the association module 60.

At a time instant t10, Mr. B stops talking. The audition module 20 ceases forming the auditory event for Mr. B, and the association module 60 disassociate the association stream for Mr. B to extinguish the auditory stream for him while leaving only the visual stream for him. And then, the attention of the robot 10 is directed to Mr. A and likewise an association stream 67 for him is formed.

In the abovementioned scenario followed, it can be seen that the robot visuoauditory system according to the present invention has features as follows:

1. When the new association stream is formed at the time instant t1, t6, the attention in the attention control module 64 is directed to the new association.

2. Even at a time instant such as t4 or t5 when the visual stream is broken off in the association stream by Mr. A disappearing, the continuation of the association stream allows the tracking of Mr. A by the auditory stream to be continued.

3. When the association stream is vanished at the time instant t6, t11, the attention control is performed by the auditory stream that has high priority next to the association stream to continue the tracking of the speaker so that the robot 10 is made facing opposite to the speaker as an object to be tracked to detect without fail the voice of the speaker arriving from the front of the microphones 16 as shown in FIG. 16.

4. At the time instant t9 and thereafter, the two speakers, Messrs. A and B, lie close to each other so that they fall within the visual field of the camera 15 (with a difference in direction of about 20 degrees). Even then, the auditory, visual and association streams for one of them are formed separately from those for the other to ensure that the individual speakers are tracked accurately and without fail.

Thus, the humanoid robot 10 is provided with its visuoauditory servo wherein if an auditory event 28 and a visual event 39 are formed, they are associated with each other to form an association stream 67 on the basis of which attention control is effected. Compared with the conventional auditory or visual servo, the visuoauditory servo of the invention using both audition and vision makes it possible to track a speaker much more accurately.

Also, if the tracking by the visual stream is broken off as shown in FIG. 17(B) (showing a fist candidate only of the visual event) as the result of the speaker hiding itself into the shade or moving into the outside of the visual field and thus disappearing, as shown in FIG. 17(C) the association stream 67 by the auditory stream allows the speaker to be tracked without fail, thereby permitting a plurality of speakers to be recognized by vision and audition and also one of them to be tracked or allows switching midway from one of them to another for tracking.

From FIG. 17(B) it is seen that in the time period t4–t5 in which the visual stream is broken off and in the time period t6–t7 in which the speaker lies in the outside of the robot's visual field the speaker cannot be tracked by the visual stream. In these time periods, however, the speaker could be tracked without fail by reference to the auditory stream as shown in FIG. 17(C).

In FIG. 17(C) it is also seen that in the time period of t3 to around 23 seconds and in the time period of abound 34 seconds to t10 the auditory streams of Messrs. A and B are separated from each other, but in time periods around t8 and around t6 an erroneous auditory stream is formed. Also, in a time period of t5 to around 17 seconds the concurrent occurrence of Mr. A's movement and the horizontal rotation of the robot 11 causes the quality of a sound signal from a sound source to be reduced owing to the speaker's movement and motor noises and their echoes so that the two speakers cannot be located much accurately. Even in such a case, referring to the visual stream as shown in FIG. 17(B) allows a speaker to be tracked without fail.

Thus, performing the visuoauditory servo of a robot using both audition and vision whereby an auditory and a visual stream are associated with each other to form an association stream allows the ambiguities which the auditory and visual streams individually possess to complement each other, thereby rising the so-called robustness of the system. Moreover, more than one speakers can be thereby individually perceived and tracked without fail.

Further, the humanoid robot 10 when serving as a party companion robot may own the face database 38 in common with a party receptionist robot, or may have the face database 38 for the party receptionist robot transmitted or copied thereto. This allows the humanoid robot 10 as a party companion robot to always recognize all the party participants by identifying their faces.

Thus, the humanoid robot 10 according to the present invention implemented as illustrated wherein on the basis of an auditory and a visual event from the audition and vision modules 20 and 30 the association module 60 forms an auditory and a visual stream and an association stream for each of a plurality of object speakers to recognize them is capable of auditorily and/or visually tracking these speakers in real time, even if any of the events is missing or it becomes impossible to recognize it distinctly, e.g., if a speaker moves and becomes "invisible", then by audition, and if a speaker ceases talking and becomes "inaudible", then by vision.

Also, the humanoid robot 10 according to the present invention implemented as illustrated wherein on the basis of an auditory and a visual event from the audition and vision modules 20 and 30 the association module 60 forms an auditory and a visual stream and an association stream for each of a plurality of object speakers and forms respective auditory and visual streams for the speakers by taking into account their temporal flows from their respective directional data and individual speaker identifications to recognize these individual speakers, respectively, is capable of auditorily and/or visually tracking these speakers in real time, even if any of the events is missing or it becomes impossible to recognize it distinctly, e.g., if a speaker moves and becomes "invisible", then by audition, and if a speaker ceases talking and becomes "inaudible", then by vision.

Also, the humanoid robot 10 according to the present invention implemented as illustrated wherein on the basis of an auditory and a visual event from the audition and vision modules 20 and 30 the association module 60 forms an auditory and a visual stream and an association stream for each of a plurality of object speakers to visuoauditorily recognize them is capable of tracking these speakers more accurately than with the servo by either audition or vision alone and is capable of auditorily and/or visually tracking these speakers in real time, even if any of the events is missing or it becomes impossible to recognize it distinctly, e.g., if a speaker moves and becomes "invisible", then by audition, and if a speaker ceases talking and becomes "inaudible", then by vision.

The modules having auditory information, visual information, motor status information and stream information displayed in their respective viewers allow all the information to be perceived outright by vision and the status of operation of the humanoid robot 10 to be readily assessed. In this case, the colors used for display in the viewers are made different for different statuses of an association stream but unified between different viewers, thus permitting each status of the association stream to be readily seized.

While in the form of implementation described above the humanoid robot 10 is shown constructed as having 4 (four) DOFs (degrees of freedom) in its action, this is not intended to be a limitation but the robot auditory system according to the present invention may be incorporated into a robot constructed to operate in any way as desired.

Also, while the form of implementation of the invention in which the robot visuoauditory system is incorporated into the humanoid robot is described above, this is not intended to be a limitation but the system may be incorporated in any form of robot such as an animal type robot, e.g., made to resemble a dog, or a plant type robot, e.g., made to resemble a flower or any other type of robot.

Further, while the form of implementation of the present invention is described above wherein if a plurality of streams of the same type exist, the oldest stream is preferentially tracked, this is not intended to be a limitation but another stream, e.g., the newest stream may preferentially be tracked.

According to the present invention described hereinbefore, the audition module receives sounds collected by microphones from external objects as sound sources and extracts pitches from the collected sounds utilizing their harmonic structures to find the directions in which the sound sources exist, respectively, and to identify the individual speakers as the respective object sound sources and then extracts their own auditory events. Also, the vision module receives images of the speakers taken by a camera and extracts from the images the respective visual events of the individual speakers upon identifying the faces of the speakers by pattern recognition and locating the speakers. Further, the motor control module extracts a motor event upon detecting a direction in which the robot faces on the basis of a rotary position of the drive motor turning the robot horizontally.

Here, the association module forms from the auditory events, the visual events and the motor event thus extracted, respectively, an auditory stream and a visual stream for each of the speakers and associates these streams with each other to form an association stream for each of the speakers and then perform attention control on the basis of these streams to make a plan of the course in which the drive motor is controlled in the motor control module.

And, the attention control module directs the robot to face towards an object speaker by controlling the drive motor in the motor control module on the basis of the plan made. Thus, directing the robot to face opposite to the object speaker allows the audition module to collect through the microphones a voice of the object speaker in the front direction in which the voice can be collected at the highest sensitivity and thereby to locate the object speaker accurately, while permitting at the same time the vision module to take through the camera a clear-cut image of that object speaker.

Accordingly, the audition module, the vision module and the motor control module made to cooperate with the association module and the attention control module allow the ambiguities which the audition and vision of the robot individually possess to complement each other, thereby rising the so-called robustness of the system. Moreover, more than one speakers can be thereby individually perceived.

Also, even when either its auditory or visual event is missing or broken off, an object speaker can be tracked through attention control on the basis of its visual or auditory event that remains extant, thereby permitting the motor control module to be controlled in real time.

Further, dealing with events and streams which are each a symbolic set of information enables data to be processed in higher level and serves to repress amounts of data to be transmitted via a network. Hence, the traffic entailed in the data transmission is lightened, which in turn contributes to the real-time processing in the entire visuoauditory system and also in the viewers.

Thus, there is provided in accordance with the present invention a highly eminent robot visuoauditory system that enables an object or objects to be tracked by both vision and audition and processed in real time.

Here, an association module is provided which on the basis of an auditory event, a visual event and a motor event thus far extracted, respectively, forms an auditory stream and a visual stream for each of speakers with reference to its directional information and upon identifying the speaker and associates these streams with each other to form an association stream. And, an attention control module is provided which on the basis of these streams effects attention control, thereby making a plan of the course in which to control the drive motor in the motor control module. Then, the association module upon locating the sound source of the auditory event and locating the face of the visual event, that is to say on the basis of directional information by each of audition and vision determines the direction in which each speaker is present and forms an auditory and a visual stream and an association stream therefor.

Also, the attention control module on the basis of the plan made acts to control the drive motor in the motor control module and to direct the robot to face towards an object speaker. Thus, directing the robot to face opposite to the object speaker allows the audition module to collect through the microphones a voice of the object speaker in the front direction in which the voice can be collected at the highest sensitivity and thereby to locate the object speaker accurately, while permitting at the same time the vision module to take through the camera a clear-cut image of that object speaker.

Accordingly, the audition module, the vision module and the motor control module are made to cooperate with the association module and the attention control, module to allow tracking the speaker with reference to the directional information for each of the auditory and visual events of the speaker identified as well as their temporal flows and thus to allow the ambiguities which the audition and vision of the robot individually possess to complement each other, thereby rising the so-called robustness of the system. Moreover, more than one speakers can be thereby individually perceived without fail.

Also, even when either its auditory or visual event is missing or broken off, an object speaker can be perceived through attention control on the basis of its visual or auditory event that remains extant, and thereby to permit the motor control module to be controlled upon seizing the direction of the object speaker accurately.

Also, according to the present invention, making the audition module, the vision module and the motor control module to cooperate with the association module and the attention control module allows the ambiguities which the audition and vision of the robot individually possess to complement each other, thereby rising the so-called robustness of the system. Moreover, more than one speakers can be thereby individually perceived.

Also, even when either its auditory or visual event is missing or broken off, an object speaker can be perceived by the attention control module on the basis of only its visual or auditory event that remains extant, thereby permitting the motor control module to be controlled in real time.

Further, displays are included to display at least a portion of the auditory information by the audition module, the visual information by the vision module and the motor information by the motor control module and the stream information by the association module and to visualize the real-time processing by the association module, thereby permitting the status of the real-time processing to be instantly perceived by vision.

Also, according to the present invention, the audition module, the vision module and the motor control module are made to cooperate with the association module and the attention control module to allow both audition and vision to be used while permitting the ambiguities which the audition and vision of the robot individually possess to complement each other, thereby rising the so-called robustness of the system. Moreover, more than one speakers can be thereby individually perceived without fail.

Also, even when either its auditory or visual event is missing or broken off, an object speaker can be perceived through attention control on the basis of only its visual or auditory event that remains extant, thereby permitting the motor control module to be controlled in real time.

Further, by tracking a speaker by using either or both of the auditory and visual streams depending on the particular circumstances encountered, it is possible to track the speaker all the times with greater accuracy. Also, if more than one auditory streams and more than one visual streams are present, suitably using one or two of them depending on the particular circumstances encountered allows the individual speakers to be tracked with greater accuracy.

There is thus provided in accordance with the present invention a highly eminent robot visuoauditory system whereby the visual and auditory information for each of objects are unified to track the objects without fail.

INDUSTRIAL APPLICABILITY

A robot visuoauditory system according to the present invention is applicable not only to a party receptionist and/or companion robot but to almost the entire field of industry. For example, it is thought to be applicable to various receptionist robots and monitoring robots.

What is claimed is:

1. A visuoauditory system for a robot, characterized in that it comprises: an audition module including at least a pair of microphones for collecting external sounds;

a vision module including a camera for taking an image in front of the robot;

a motor control module including a drive motor for turning the robot horizontally;

an association module for combining events from said audition module, said visual module and said motor control module to produce streams; and an attention control module for effecting attention control on the basis of the streams produced by said association module, whereby:

said audition module in response to sound signals from said microphones is adapted to extract pitches therefrom, separate their sound sources from each other and locate sound sources such as to identify a sound source as at least one speaker, thereby extracting an auditory event;

said vision module on the basis of an image taken by the camera is adapted to identify by face, and locate, each such speaker, thereby extracting a visual event therefor;

said motor control module in response to a rotary position of said drive motor is adapted to extract a motor event therefrom;

said association module on the basis of the auditory event from said audition module, the visual event from said vision module and the motor event from said motor control module is adapted to form an auditory stream and a visual stream and then associate these streams with each other to form an association stream; and said attention control module in effecting the attention control is adapted to make a plan for a course in which to control said drive motor in said motor control module in accordance with said streams.

2. A robot visuoauditory system as set forth in claim 1, characterized in that said association module when forming said auditory and visual streams is adapted to synchronize said auditory, visual and motor events which are formed asynchronously with each other.

3. A robot visuoauditory system as set forth in claim 1 or claim 2, characterized in that said association module is made a server and each of said audition, vision and motor control modules are made a client connected to said server.

4. A robot visuoauditory system as set forth in claim 3, characterized in that said server and each said client are interconnected via LAN.

5. A robot visuoauditory system as set forth in of claims 1 or claim 2, characterized in that when said attention control module effects the attention control, higher priority is given in the order of the association stream, the auditory stream and the visual stream.

6. A robot visuoauditory system as set forth in claim 1 or claim 2, characterized in that said association module when forming said auditory and visual streams is adapted to synchronize said auditory, visual and motor events with each other.

7. A visuoauditory system for a robot, characterized in that it comprises:

an audition module including at least a pair of microphones for collecting external sounds;

a vision module including a camera for taking an image in front of the robot;

a motor control module including a drive motor for turning the robot horizontally;

an association module for combining events from said audition module, said visual module and said motor control module to produce streams; and an attention control module for effecting attention control on the basis of the streams produced by said association module, whereby:

said audition module in response to sound signals from said microphones is adapted to extract pitches therefrom, separate their sound sources from each other and locate sound sources such as to identify a sound source as at least one speaker, thereby extracting an auditory event;

said vision module on the basis of an image taken by the camera is adapted to identify by face, and locate, each such speaker, and then to identify it as the sound source, thereby extracting a visual event therefor;

said motor control module in response to a rotary position of said drive motor is adapted to extract a motor event therefrom;

said association module on the basis of said auditory event, said visual event and said motor event is adapted to form an auditory stream and a visual stream upon determining a direction in which each such speaker lies on the basis of directional information derived from locating the sound source of said auditory event and that from locating the face of said visual event, and then to associate these streams with each other to form an association stream; and said attention control module in effecting the attention control is adapted to make a plan for a course in which to control said drive motor in said motor control module in accordance with said streams.

8. A robot visuoauditory system as set forth in claim 7, characterized in that said association module when forming said auditory and visual streams is adapted to synchronize said auditory, visual and motor events which are formed asynchronously with each other.

9. A robot visuoauditory system as set forth in claim 7 or 8, characterized in that:

said audition module is adapted to identify each such speaker upon detecting a voice MFCC from the sound signals, and said association module is adapted to select said auditory stream and said visual stream to which said auditory event and said visual event are to be connected, by specifying each such speaker on the basis of speaker identification for said auditory event and speaker identification for said visual event.

10. A robot visuoauditory system as set forth in claim 7 or 8, characterized in that with a plurality of streams coming close to one another, said association module is adapted to select said auditory stream and said visual stream to which said auditory event and said visual event are to be connected, by referring to temporal flows of said auditory and visual events.

11. A robot visuoauditory system as set forth in claim 7 or 8, characterized in that said association module is adapted to associate said auditory stream and said visual stream with each other to form said association stream if they are strongly associated with each other and to disassociate and extinguish said association stream when said auditory and visual streams which make up the same become weakly associated with each other.

12. A visuoauditory system for a robot, characterized in that it comprises:

an audition module including at least a pair of microphones for collecting external sounds;

a vision module including a camera for taking an image in front of the robot;

a motor control module including a drive motor for turning the robot horizontally;

an association module for combining events from said audition module, said visual module and said motor control module to produce streams; and an attention control module for effecting attention control on the basis of the streams produced by said association module, whereby:

said audition module in response to sound signals from said microphones is adapted to extract pitches therefrom, separate their sound sources from each other and locate sound sources such as to identify a sound source as at least one speaker, thereby extracting an auditory event;

said vision module on the basis of an image taken by the camera is adapted to identify by face, and locate, each such speaker, thereby extracting a visual event therefor;

said motor control module in response to a rotary position of said drive motor is adapted to extract a motor event therefrom;

said association module on the basis of the auditory event, the visual event and the motor event is adapted to form an auditory stream and a visual stream and then associate these streams with each other to form an association stream; and said attention control module in effecting the attention control is adapted to make a plan for a course in which to control said drive motor in said motor control module in accordance with said streams;

wherein said system further comprises a display for displaying at least a portion of auditory information for said audition module, visual information for said vision module, motor information for said motor control module and stream information for said association module.

13. A robot visuoauditory system as set forth in claim 12, characterized in that said display includes an auditory display for displaying as said auditory information, a spectrum of sound signals from sound sources and peaks extracted therefrom and said auditory event.

14. A robot visuoauditory system as set forth in claim 13, characterized in that said auditory display is adapted to display said auditory event in the form of a circle with its center representing the robot, its axis of ordinates representing relative angles of the direction that the robot may face, its axis of abscissas representing pitches and its diameter representing a belief factor.

15. A robot visuoauditory system as set forth in any one of claims 12 to 14, characterized in that said display includes a visual display for displaying as said visual information, an image of an extracted face taken by the camera and shown within a frame, and said visual event.

16. A robot visuoauditory system as set forth in claim 15, characterized in that said visual display is adapted to display said visual event in the form of list of face identifications and face locations extracted with degrees of firmness.

17. A robot visuoauditory system as set forth in any one of claims 12 to 14, characterized in that said display includes a motor display for displaying as said motor information, the direction in which and the speed at which the robot moves, three-dimensionally in real time.

18. A robot visuoauditory system as set forth in claim 17, characterized in that said display includes a stream display for displaying as said stream information, a stream chart and a radar chart.

19. A robot visuoauditory system as set forth in claim 18, characterized in that said stream display is adapted to display in said stream chart, said auditory, visual and association streams constituting said stream information.

20. A robot visuoauditory system as set forth in claim 18, characterized in that said stream display is adapted to display in said radar chart, an instantaneous status of said streams with a visual field of the camera and upon sound source location.

21. A visuoauditory system for a robot, characterized in that it comprises:

an audition module including at least a pair of microphones for collecting external sounds;

a vision module including a camera for taking an image in front of the robot;

a motor control module including a drive motor for turning the robot horizontally;

an association module for combining events from said audition module, said visual module and said motor control module to produce streams; and an attention control module for effecting attention control on the basis of the streams produced by said association module, whereby:

said audition module in response to sound signals from said microphones is adapted to extract pitches therefrom, separate their sound sources from each other and locate sound sources such as to identify a sound source as at least one speaker, thereby extracting an auditory event;

said vision module on the basis of an image taken by the camera is adapted to identify by face, and locate, each such speaker, thereby extracting a visual event therefor;

said motor control module in response to a rotary position of said drive motor is adapted to extract a motor event therefrom;

said association module-on the basis of the auditory event, the visual event and the motor event is adapted to form an auditory stream and a visual stream and then associate these streams with each other to form an association stream; and said attention control module in effecting the attention control is adapted to make a plan for a course in which to control said drive motor in said motor control module in accordance with said streams, thereby effecting a visuoauditory servo for the robot.

22. A robot visuoauditory system as set forth in claim 21, characterized in that when said attention control module effects the attention control, higher priority is given in the order of the association stream, the auditory stream and the visual stream.

23. A robot visuoauditory system as set forth in claim 21 or claim 22, characterized in that said attention control module in the absence of more than one auditory or visual streams is adapted to select from them one auditory or visual stream according to circumstances, and to form an association stream, thereby effecting the attention control on the basis of such an auditory, visual or association stream.

24. A robot visuoauditory system as set forth in claim 1 characterized in that said robot is a humanoid robot.

25. A robot visuoauditory system as set forth in claim 1, characterized in that said robot is an animal type robot.

26. A robot visuoauditory system as set forth in claim 1, characterized in that said robot is a plant type robot.

* * * * *